United States Patent
Ryu et al.

(10) Patent No.: US 11,696,354 B2
(45) Date of Patent: Jul. 4, 2023

(54) METHOD AND DEVICE FOR PERFORMING JOINT TRANSMISSION IN WIRELESS LAN SYSTEM

(71) Applicant: LG ELECTRONICS INC., Seoul (KR)

(72) Inventors: Kiseon Ryu, Seoul (KR); Sungjin Park, Seoul (KR); Sanggook Kim, Seoul (KR); Jeongki Kim, Seoul (KR); Jinsoo Choi, Seoul (KR)

(73) Assignee: LG ELECTRONICS INC., Seoul (KR)

(*) Notice: Subject to any disclaimer, the term of this patent is extended or adjusted under 35 U.S.C. 154(b) by 150 days.

(21) Appl. No.: 17/265,947

(22) PCT Filed: Aug. 21, 2019

(86) PCT No.: PCT/KR2019/010632
§ 371 (c)(1),
(2) Date: Feb. 4, 2021

(87) PCT Pub. No.: WO2020/045891
PCT Pub. Date: Mar. 5, 2020

(65) Prior Publication Data
US 2021/0307099 A1    Sep. 30, 2021

Related U.S. Application Data

(60) Provisional application No. 62/790,457, filed on Jan. 9, 2019, provisional application No. 62/737,874, filed
(Continued)

(51) Int. Cl.
*H04W 56/00* (2009.01)
*H04W 76/15* (2018.01)
(Continued)

(52) U.S. Cl.
CPC .......... *H04W 76/15* (2018.02); *H04L 1/0004* (2013.01); *H04L 1/1896* (2013.01);
(Continued)

(58) Field of Classification Search
CPC ... H04W 76/15; H04W 76/11; H04W 56/001; H04W 72/0446; H04W 72/1289; H04W 80/02; H04L 1/004; H04L 1/1896
(Continued)

(56) References Cited

U.S. PATENT DOCUMENTS

2014/0362840 A1* 12/2014 Wong .................... H04L 1/0003
370/338
2015/0009966 A1* 1/2015 Lee ...................... H04B 7/0617
370/336
(Continued)

FOREIGN PATENT DOCUMENTS

JP    2016019021    2/2016
KR    20120115362   10/2012
(Continued)

OTHER PUBLICATIONS

PCT International Application No. PCT/KR2019/010632, International Search Report dated Nov. 28, 2019, 4 pages.

*Primary Examiner* — Sai Ming Chan
(74) *Attorney, Agent, or Firm* — Lee Hong Degerman Kang Waimey

(57) ABSTRACT

Provided are a method and device for performing joint transmission in wireless LAN system. Particularly, an M-AP transmits a first control frame for informing of joint transmission to first and second S-APs. The M-AP transmits a data frame to the first and second S-APs. The M-AP transmits a second control frame, comprising scheduling information necessary for joint transmission, to the first and second S-APs. The M-AP performs joint transmission to an
(Continued)

STA by means of the first and second SAPs. The data frame is transmitted to the STA from the first and second S-APs by means of joint transmission.

12 Claims, 30 Drawing Sheets

Related U.S. Application Data on Sep. 27, 2018, provisional application No. 62/722,966, filed on Aug. 26, 2018.

(51) Int. Cl.
*H04W 76/11* (2018.01)
*H04L 1/00* (2006.01)
*H04L 1/1867* (2023.01)
*H04W 72/0446* (2023.01)
*H04W 80/02* (2009.01)
*H04W 72/23* (2023.01)
*H04W 84/12* (2009.01)

(52) U.S. Cl.
CPC ..... *H04W 56/001* (2013.01); *H04W 72/0446* (2013.01); *H04W 72/23* (2023.01); *H04W 76/11* (2018.02); *H04W 80/02* (2013.01); *H04W 84/12* (2013.01)

(58) Field of Classification Search
USPC ........................................................ 370/329
See application file for complete search history.

(56) References Cited

U.S. PATENT DOCUMENTS

| | | | |
|---|---|---|---|
| 2015/0295629 A1* | 10/2015 | Xia | H04B 7/0695 370/329 |
| 2017/0257196 A1 | 9/2017 | Ghosh et al. | |
| 2019/0081664 A1* | 3/2019 | Vermani | H04B 7/024 |
| 2020/0045560 A1* | 2/2020 | Vermani | H04W 16/28 |

FOREIGN PATENT DOCUMENTS

| | | |
|---|---|---|
| KR | 20160060585 | 5/2016 |
| KR | 20170102228 | 9/2017 |

* cited by examiner

FIG. 1
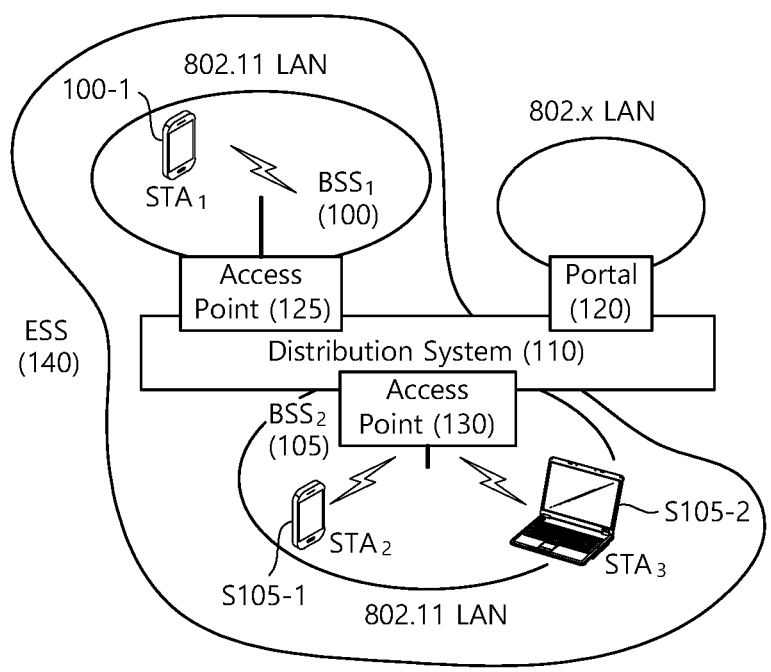
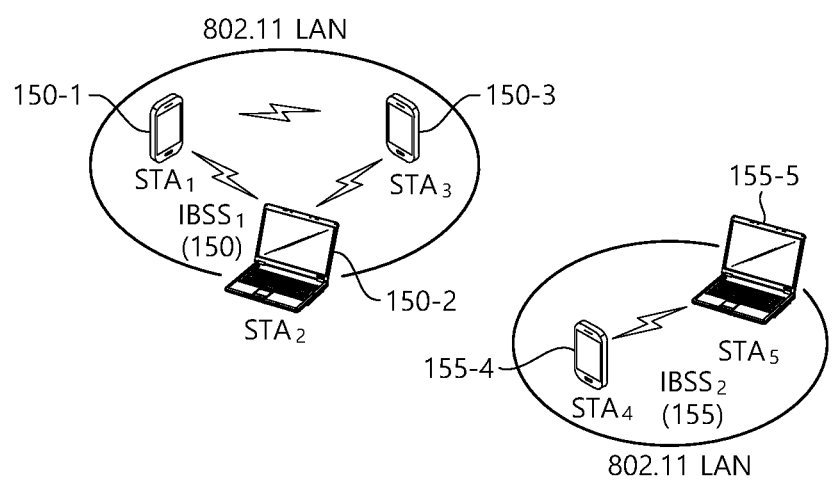

METHOD AND DEVICE FOR PERFORMING JOINT TRANSMISSION IN WIRELESS LAN SYSTEM

CROSS-REFERENCE TO RELATED APPLICATIONS

This application is the National Stage filing under 35 U.S.C. 371 of International Application No. PCT/KR2019/010632, filed on Aug. 21, 2019, which claims the benefit of U.S. Provisional Application Nos. 62/722,966 filed on Aug. 26, 2018, 62/737,874 filed on Sep. 27, 2018, and 62/790,457 filed on Jan. 9, 2019, the contents of which are all incorporated by reference herein in their entirety.

BACKGROUND

Field

This specification relates to a scheme for performing joint transmission in a WLAN system and, more particularly, to a method and apparatus for transmitting, by a multi-AP, a joint frame in a WLAN system.

Related Art

A discussion of a next-generation wireless local area network (WLAN) is in progress. In the next-generation WLAN, an object is to 1) improve an Institute of Electronic and Electronics Engineers (IEEE) 802.11 physical (PHY) layer and a medium access control (MAC) layer in 2.4 GHz and 5 GHz bands, 2) increase spectrum efficiency and area throughput, 3) improve performance in actual indoor and outdoor environments, such as an environment in which an interference source exists, a dense heterogeneous network environment, and an environment in which a high user load exists.

An environment chiefly considered in the next-generation WLAN is a dense environment in which access points (APs) and stations (STAs) are a lot and under the dense environment, improvement of the spectrum efficiency and the area throughput is discussed. Further, in the next-generation WLAN, in addition to the indoor environment, in the outdoor environment which is not considerably considered in the existing WLAN, substantial performance improvement is concerned.

Specifically, in the next-generation WLAN, there is a great interest in scenarios, such as wireless office, smart home, stadium, Hotspot, and building/apartment. A discussion of the improvement of system performance in a dense environment in which APs and STAs are many is in progress based on the corresponding scenarios.

In the next-generation WLAN, improvement of system performance in an overlapping basic service set (OBSS) environment and improvement of outdoor environment performance, and cellular offloading are anticipated to be actively discussed rather than improvement of single link performance in one basic service set (BSS). The directionality of the next-generation WLAN means that the next-generation WLAN gradually has a technical scope similar to mobile communication. When a situation in which the mobile communication and the WLAN technology have been discussed in a small cell and a direct-to-direct (D2D) communication area in recent years is considered, it is expected that technical and business convergence of the next-generation WLAN and the mobile communication will be further active.

SUMMARY

This specification proposes a method and apparatus for performing a joint frame in a WLAN system.

An example of this specification proposes a method of performing a joint frame.

The present embodiment may be performed in a network environment in which a next-generation WLAN system is supported. The next-generation WLAN system is an improved WLAN system of an 802.11ax system, and can satisfy backward compatibility with the 802.11ax system.

The present embodiment is performed in a master-AP (M-AP) supporting a multi-AP. A reception apparatus of the present embodiment may correspond to a STA supporting an extremely high throughput (EHT) WLAN system.

The master-access point (M-AP) transmits a first control frame for providing notification of the joint transmission to first and second slave-access points (S-APs).

The M-AP transmits a data frame to the first and second S-APs. In this case, the data frame is a data frame to be transmitted to the STA through the joint transmission.

The M-AP transmits, to the first and second S-APs, a second control frame including scheduling information necessary for the joint transmission.

The M-AP performs the joint transmission on a station (STA) through the first and second S-APs.

The M-AP plays a role of a coordinator for coordinating a multi-AP (wherein the first S-AP and second S-Aps are included).

The first control frame may be a joint transmission announcement (JTA) frame. That is, the first control frame may be said to include control information for initiating the joint transmission for the first and second S-APs.

The first control frame may include a first identifier and a second identifier. The first identifier may be an association identifier (AID) or MAC address of the first and second S-APs participating in the joint transmission. The second identifier may be temporary identifiers of the first and second S-APs and the STA participating in the joint transmission.

The second control frame may be a synchronization frame or a joint transmission trigger frame.

The second control frame may include information on a bandwidth, a resource unit, a modulation and coding scheme (MCS), multi-input multi-output (MIMO), and transmission power for the scheduling of the data frame.

The synchronization of the first and second S-APs for the joint transmission may be performed based on the synchronization frame.

Furthermore, the M-A may receive, from the first and second S-APs, a first ACK frame as a response to the first control frame. Furthermore, the M-A may receive, from the first and second S-APs, a second ACK frame as a response to the data frame. In this case, a procedure of receiving the first and second ACK frames may be selectively omitted.

A third ACK frame, that is, a response to the data frame transmitted through the joint transmission, may be transmitted from the STA to the first S-AP. In this case, the first S-AP is associated with the STA. Accordingly, the STA may transmit the third ACK to only the first S-AP.

The M-AP may receive, from the first S-AP, a fourth ACK frame including the same ACK information as the third ACK frame. Whether the STA has successfully received a data frame through the joint transmission may be shared between the APs through the procedure of receiving the third and fourth ACK frames. In this case, the procedure of receiving the third and fourth ACK frames may be selectively omitted.

All of the aforementioned procedures are performed within one TXOP. If the STA has failed in the reception of the data frame, the STA may perform the joint transmission again by repeating the aforementioned procedures during another TXOP.

The M-AP may select an S-AP that will participate in the joint transmission based on channel state information.

The channel state information may be measured by the STA and included in an NDP frame. The null data packet (NDP) frame may be transmitted from the STA to the first S-AP based on an NDP trigger frame. Likewise, the first S-AP is associated with the STA. The NDP trigger frame may be transmitted from the first S-AP to the STA based on the first control frame. The aforementioned procedures are descriptions of a sounding procedure based on the NDP frame.

The M-AP and the first and second S-APs may be connected through wireless backhaul.

According to an embodiment proposed in this specification, interference from an OBSS STA or an unintended STA can be prevented and joint transmission can be efficiently performed by performing a sounding procedure according to a multi-AP coordination method.

BRIEF DESCRIPTION OF THE DRAWINGS

FIG. 1 is a conceptual view illustrating the structure of a wireless local area network (WLAN).

DESCRIPTION OF EXEMPLARY EMBODIMENTS

Figure 2:
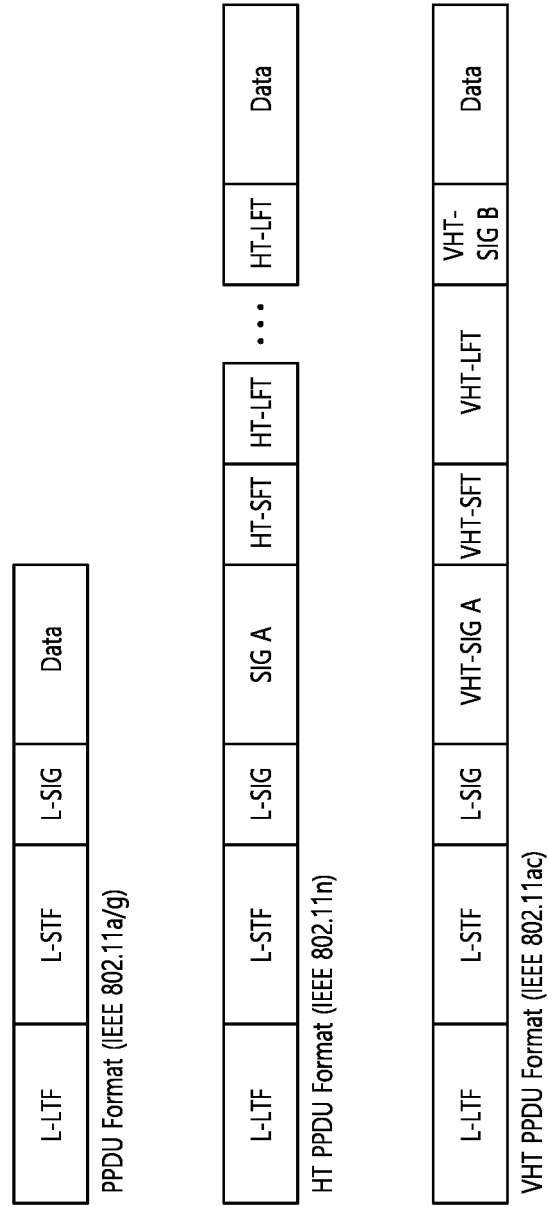
FIG. 2 is a diagram illustrating an example of a PPDU used in an IEEE standard.

FIG. 1 is a conceptual view illustrating the structure of a wireless local area network (WLAN).

An upper part of FIG. 1 illustrates the structure of an infrastructure basic service set (BSS) of institute of electrical and electronic engineers (IEEE) 802.11.

Referring the upper part of FIG. 1, the wireless LAN system may include one or more infrastructure BSSs (100, 105) (hereinafter, referred to as BSS). The BSSs (100, 105), as a set of an AP and a STA such as an access point (AP) (125) and a station (STA1) (100-1) which are successfully synchronized to communicate with each other, are not concepts indicating a specific region. The BSS (105) may include one or more STAs (105-1, 105-2) which may be joined to one AP (130).

The BSS may include at least one STA, APs providing a distribution service, and a distribution system (DS) (110) connecting multiple APs.

The distribution system (110) may implement an extended service set (ESS) (140) extended by connecting the multiple BSSs (100, 105). The ESS (140) may be used as a term indicating one network configured by connecting one or more APs (125, 130) through the distribution system (110). The AP included in one ESS (140) may have the same service set identification (SSID).

A portal (120) may serve as a bridge which connects the wireless LAN network (IEEE 802.11) and another network (e.g., 802.X).

In the BSS illustrated in the upper part of FIG. 1, a network between the APs (125, 130) and a network between the APs (125, 130) and the STAs (100-1, 105-1, 105-2) may be implemented. However, the network is configured even between the STAs without the APs (125, 130) to perform communication. A network in which the communication is performed by configuring the network even between the STAs without the APs (125, 130) is defined as an Ad-Hoc network or an independent basic service set (IBSS).

A lower part of FIG. 1 illustrates a conceptual view illustrating the IBSS.

Referring to the lower part of FIG. 1, the IBSS is a BSS that operates in an Ad-Hoc mode. Since the IBSS does not include the access point (AP), a centralized management entity that performs a management function at the center does not exist. That is, in the IBS S, STAs (150-1, 150-2, 150-3, 155-4, 155-5) are managed by a distributed manner. In the IBSS, all STAs (150-1, 150-2, 150-3, 155-4, 155-5) may be constituted by movable STAs and are not permitted to access the DS to constitute a self-contained network.

The STA as a predetermined functional medium that includes a medium access control (MAC) that follows a regulation of an Institute of Electrical and Electronics Engineers (IEEE) 802.11 standard and a physical layer interface for a radio medium may be used as a meaning including all of the APs and the non-AP stations (STAs).

The STA may be called various a name such as a mobile terminal, a wireless device, a wireless transmit/receive unit (WTRU), user equipment (UE), a mobile station (MS), a mobile subscriber unit, or just a user.

Meanwhile, the term user may be used in various meanings, for example, in wireless LAN communication, this term may be used to signify a STA participating in uplink MU MIMO and/or uplink OFDMA transmission. However, the meaning of this term will not be limited only to this.

FIG. 2 is a diagram illustrating an example of a PPDU used in an IEEE standard.

As illustrated in FIG. 2, various types of PHY protocol data units (PPDUs) may be used in a standard such as IEEE a/g/n/ac, and so on. Specifically, LTF and STF fields include a training signal, SIG-A and SIG-B include control information for a receiving station, and a data field includes user data corresponding to a PSDU.

In the embodiment, an improved technique is provided, which is associated with a signal (or a control information field) used for the data field of the PPDU. The signal provided in the embodiment may be applied onto high efficiency PPDU (HE PPDU) according to an IEEE 802.11ax standard. That is, the signal improved in the embodiment may be HE-SIG-A and/or HE-SIG-B included in the HE PPDU. The HE-SIG-A and the HE-SIG-B may be represented even as the SIG-A and SIG-B, respectively. However, the improved signal proposed in the embodiment is not particularly limited to an HE-SIG-A and/or HE-SIG-B standard and may be applied to control/data fields having various names, which include the control information in a wireless communication system transferring the user data.

Figure 3:
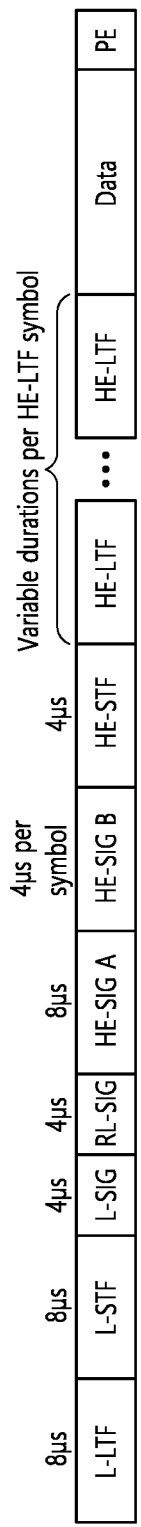
FIG. 3 is a diagram illustrating an example of an HE PDDU.

FIG. 3 is a diagram illustrating an example of an HE PDDU.

The control information field provided in the embodiment may be the HE-SIG-B included in the HE PPDU. The HE PPDU according to FIG. 3 is one example of the PPDU for multiple users and only the PPDU for the multiple users may include the HE-SIG-B and the corresponding HE SIG-B may be omitted in a PPDU for a single user.

As illustrated in FIG. 3, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (or an MAC payload), and a packet extension (PE) field. The respective fields may be transmitted during an illustrated time period (that is, 4 or 8 μs).

More detailed description of the respective fields of FIG. 3 will be made below.

Figure 4:
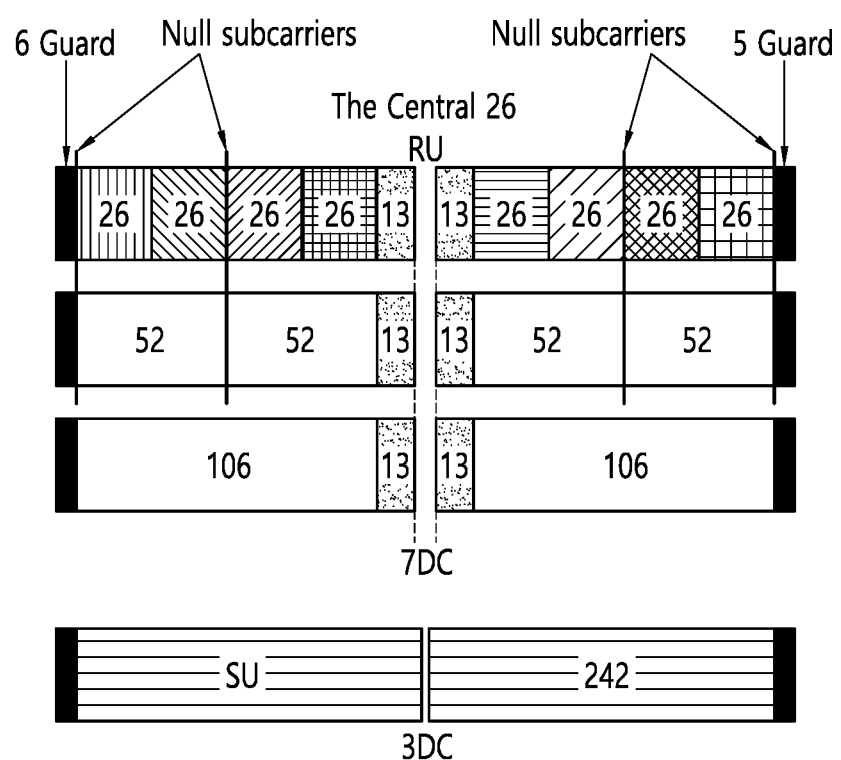
FIG. 4 is a diagram illustrating a layout of resource units (RUs) used in a band of 20 MHz.

FIG. 4 is a diagram illustrating a layout of resource units (RUs) used in a band of 20 MHz.

As illustrated in FIG. 4, resource units (RUs) corresponding to tone (that is, subcarriers) of different numbers are used to constitute some fields of the HE-PPDU. For example, the resources may be allocated by the unit of the RU illustrated for the HE-STF, the HE-LTF, and the data field.

As illustrated in an uppermost part of FIG. 4, 26 units (that is, units corresponding to 26 tones). 6 tones may be used as a guard band in a leftmost band of the 20 MHz band and 5 tones may be used as the guard band in a rightmost band of the 20 MHz band. Further, 7 DC tones may be inserted into a center band, that is, a DC band and a 26-unit corresponding to each 13 tones may be present at left and right sides of the DC band. The 26-unit, a 52-unit, and a 106-unit may be allocated to other bands. Each unit may be allocated for a receiving station, that is, a user.

Meanwhile, the RU layout of FIG. 4 may be used even in a situation for a single user (SU) in addition to the multiple users (MUs) and, in this case, as illustrated in a lowermost part of FIG. 4, one 242-unit may be used and, in this case, three DC tones may be inserted.

In one example of FIG. 4, RUs having various sizes, that is, a 26-RU, a 52-RU, a 106-RU, a 242-RU, and the like are proposed, and as a result, since detailed sizes of the RUs may extend or increase, the embodiment is not limited to a detailed size (that is, the number of corresponding tones) of each RU.

Figure 5:
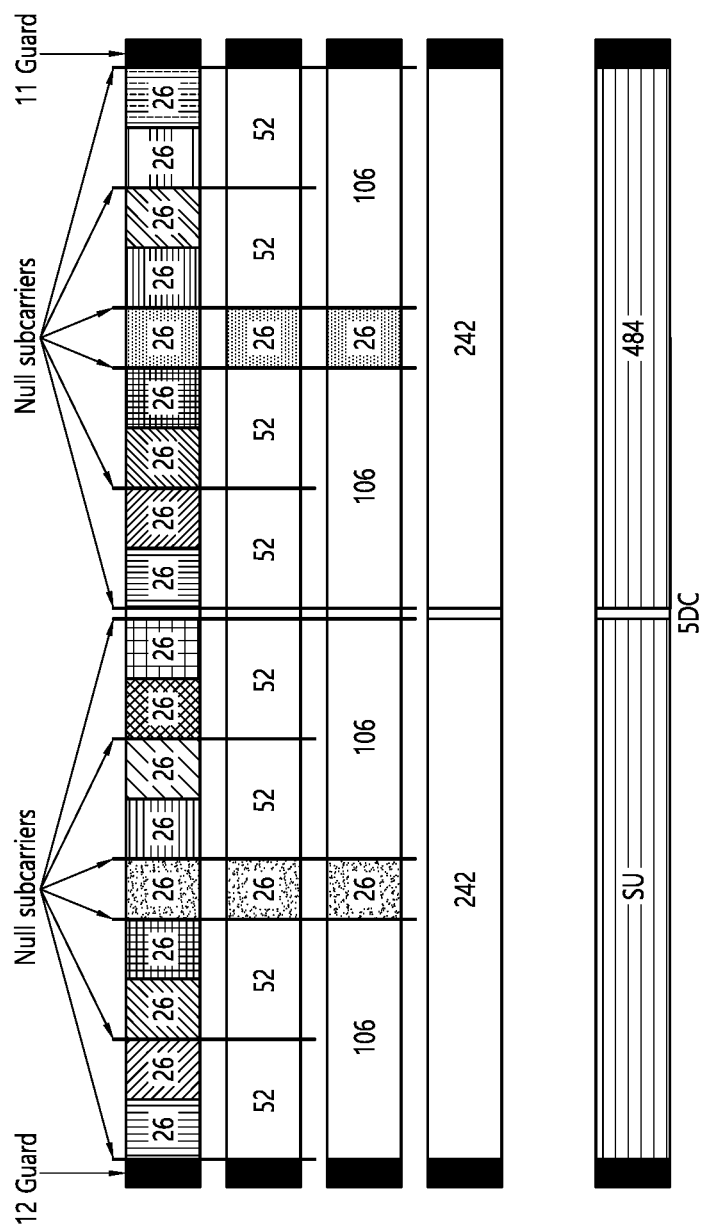
FIG. 5 is a diagram illustrating a layout of resource units (RUs) used in a band of 40 MHz.

FIG. 5 is a diagram illustrating a layout of resource units (RUs) used in a band of 40 MHz.

Similarly to a case in which the RUs having various RUs are used in one example of FIG. 4, 26-RU, 52-RU, 106-RU, 242-RU, 484-RU, and the like, may be used even in one example of FIG. 5. Further, 5 DC tones may be inserted into a center frequency, 12 tones may be used as the guard band in the leftmost band of the 40 MHz band and 11 tones may be used as the guard band in the rightmost band of the 40 MHz band.

In addition, as illustrated in FIG. 5, when the RU layout is used for the single user, the 484-RU may be used. That is, the detailed number of RUs may be modified similarly to one example of FIG. 4.

Figure 6:
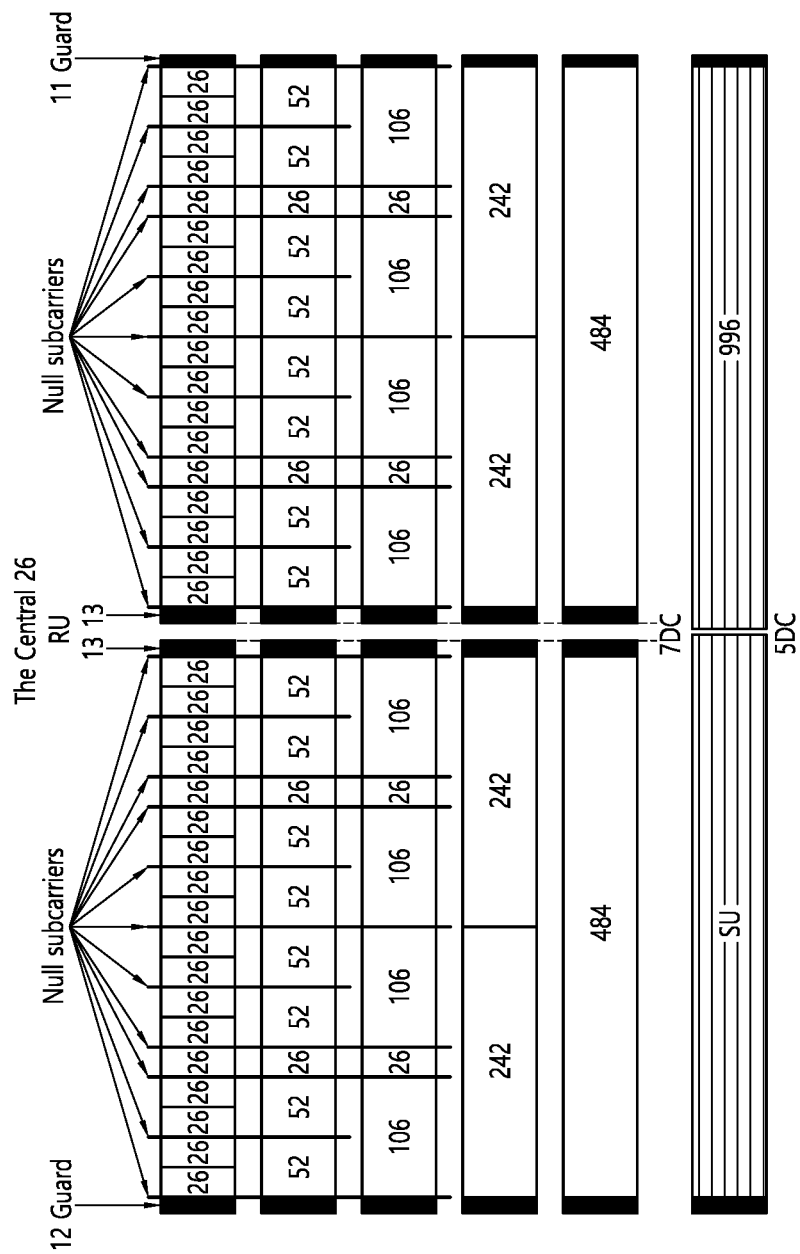
FIG. 6 is a diagram illustrating a layout of resource units (RUs) used in a band of 80 MHz.

FIG. 6 is a diagram illustrating a layout of resource units (RUs) used in a band of 80 MHz.

Figure 26:
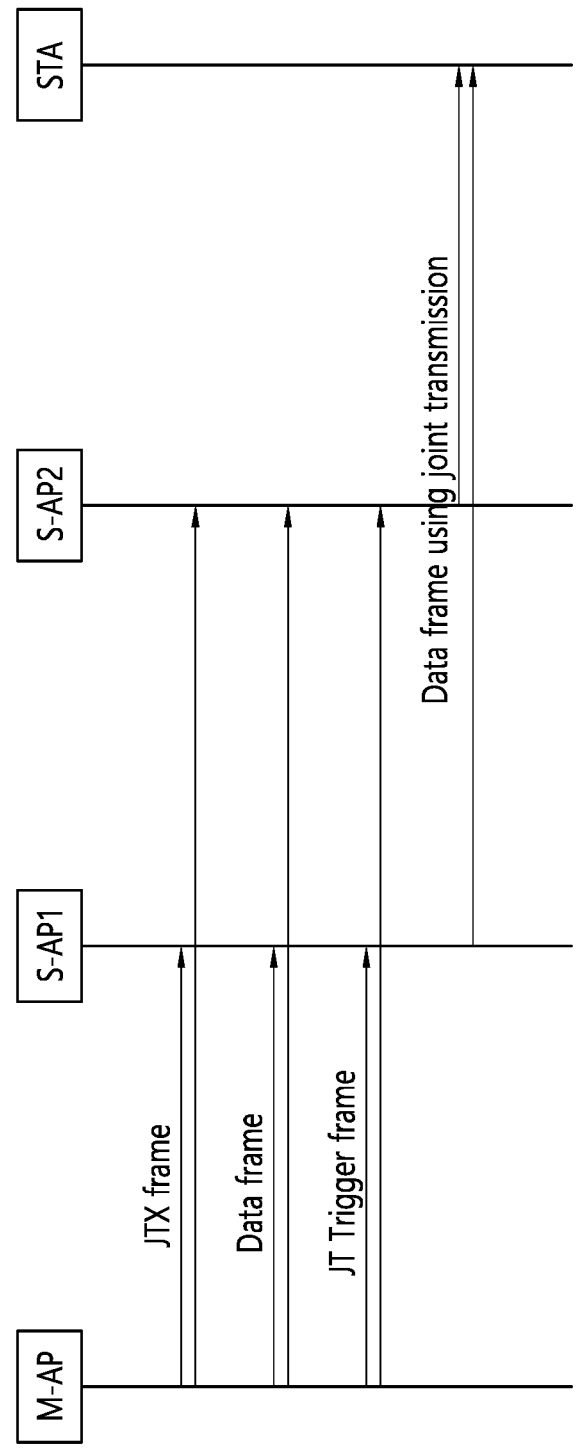
FIG. 26 illustrates a procedure of joint transmission from a multi-AP.

Similarly to a case in which the RUs having various RUs are used in one example of each of FIG. 4 or 5, 26-RU, 52-RU, 106-RU, 242-RU, 484-RU, and the like, may be used even in one example of FIG. 6. Further, 7 DC tones may be inserted into the center frequency, 12 tones may be used as the guard band in the leftmost band of the 80 MHz band and 11 tones may be used as the guard band in the rightmost band of the 80 MHz band. In addition, the 26-RU may be used, which uses 13 tones positioned at each of left and right sides of the DC band.

Moreover, as illustrated in FIG. 6, when the RU layout is used for the single user, 996-RU may be used and, in this case, 5 DC tones may be inserted.

Meanwhile, the detailed number of RUs may be modified similarly to one example of each of FIG. 4 or FIG. 5.

Figure 7:
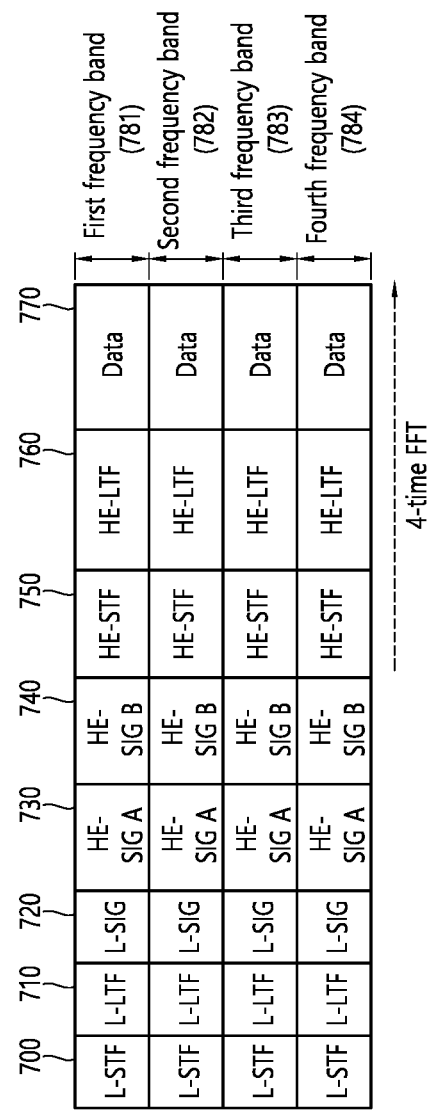
FIG. 7 is a diagram illustrating another example of the HE PPDU.

FIG. 7 is a diagram illustrating another example of the HE PPDU.

A block illustrated in FIG. 7 is another example of describing the HE-PPDU block of FIG. 3 in terms of a frequency.

An illustrated L-STF 700 may include a short training orthogonal frequency division multiplexing (OFDM) symbol. The L-STF 700 may be used for frame detection, automatic gain control (AGC), diversity detection, and coarse frequency/time synchronization.

An L-LTF 710 may include a long training orthogonal frequency division multiplexing (OFDM) symbol. The L-LTF 710 may be used for fine frequency/time synchronization and channel prediction.

An L-SIG 720 may be used for transmitting control information. The L-SIG 720 may include information regarding a data rate and a data length. Further, the L-SIG 720 may be repeatedly transmitted. That is, a new format, in which the L-SIG 720 is repeated (for example, may be referred to as R-LSIG) may be configured.

An HE-SIG-A 730 may include the control information common to the receiving station.

Specifically, the HE-SIG-A 730 may include information on 1) a DL/UL indicator, 2) a BSS color field indicating an identify of a BSS, 3) a field indicating a remaining time of a current TXOP period, 4) a bandwidth field indicating at least one of 20, 40, 80, 160 and 80+80 MHz, 5) a field indicating an MCS technique applied to the HE-SIG-B, 6) an indication field regarding whether the HE-SIG-B is modulated by a dual subcarrier modulation technique for MCS, 7) a field indicating the number of symbols used for the HE-SIG-B, 8) a field indicating whether the HE-SIG-B is configured for a full bandwidth MIMO transmission, 9) a field indicating the number of symbols of the HE-LTF, 10) a field indicating the length of the HE-LTF and a CP length, 11) a field indicating whether an OFDM symbol is present for LDPC coding, 12) a field indicating control information regarding packet extension (PE), and 13) a field indicating information on a CRC field of the HE-SIG-A, and the like. A detailed field of the HE-SIG-A may be added or partially omitted. Further, some fields of the HE-SIG-A may be partially added or omitted in other environments other than a multi-user (MU) environment.

In addition, the HE-SIG-A 730 may be composed of two parts: HE-SIG-A1 and HE-SIG-A2. HE-SIG-A1 and HE-SIG-A2 included in the HE-SIG-A may be defined by the following format structure (fields) according to the PPDU. First, the HE-SIG-A field of the HE SU PPDU may be defined as follows.

TABLE 1

| Two Parts of HE-SIG-A | Bit | Field | Number of bits | Description |
|---|---|---|---|---|
| HE-SIG-A1 | B0 | Format | 1 | Differentiate an HE SU PPDU and HE ER SU PPDU from an HE TB PPDU: Set to 1 for an HE SU PPDU and HE ER SU PPDU |
| | B1 | Beam Change | 1 | Set to 1 to indicate that the pre-HE modulated fields of the PPDU are spatially mapped differently from the first symbol of the HE-LTF. Equation (28-6), Equation (28-9), Equation (28-12). Equation (28-14). Equation (28-16) and Equation (28-18) apply if the Beam Change field is set to 1. Set to 0 to indicate that the pre-HE modulated fields of the PPDU are spatially mapped the same way as the first symbol of the HE-LTF on each tone. Equation (28-8), Equation (28-10), Equation (28-13), Equation (28-15), Equation (28-17) and Equation (28-19) apply if the Beam Change field is set to 0.(#16803) |
| | B2 | UL/DL | 1 | Indicates whether the PPDU is sent UL or DL. Set to the value indicated by the TXVECTOR parameter UPLINK_FLAG. |
| | B3-B6 | MCS | 4 | For an HE SU PPDU: Set to n for MCSn, where n = 0, 1, 2, . . . , 11 Values 12-15 are reserved For HE ER SU PPDU with Bandwidth field set to 0 (242-tone RU): Set to n for MCSn, where n = 0, 1, 2 Values 3-15 are reserved For HE ER SU PPDU with Bandwidth field set to 1 (upper frequency 106-tone RU): Set to 0 for MCS 0 Values 1-15 arc reserved |
| | B7 | DCM | 1 | Indicates whether or not DCM is applied to the Data field for the MCS indicated. If the STBC field is 0, then set to 1 to indicate that DCM is applied to the Data field. Neither DCM nor STBC shall be applied if (#15489) both the DCM and STBC are set to 1. Set to 0 to indicate that DCM is not applied to the Data field. NOTE DCM is applied only to HE-MCSs 0, 1, 3 and 4. DCM is applied only to 1 and 2 spatial streams. DCM is not applied in combination with STBC(#15490). |
| | B8-B13 | BSS Color | 6 | The BSS Color field is an identifier of the BSS. Set to the value of the TXVECTOR parameter BSS_COLOR. |
| | B14 | Reserved | 1 | Reserved and set to 1 |
| | B15-B18 | Spatial Reuse | 4 | Indicates whether or not spatial reuse is allowed during the transmission of this PPDU(#16804). Set to a value from Table 28-21 (Spatial Reuse field encoding for an HE SU PPDU, HE ER SU PPDU, and HE MU PPDU), see 27.11.6 (SPATIAL_REUSE) Set to SRP_DISALLOW to prohibit SRP-based spatial reuse during this PPDU. Set to SRP_AND_NON_S-RG_OBSS_PD_PROHIBITED to prohibit both SRP-based spatial reuse and non-SRG OBSS PD-based spatial reuse during this PPDU. For the interpretation of other values see 27.11.6 (SPATIAL_REUSE) and 27.9 (Spatial reuse operation). |

TABLE 1-continued

| Two Parts of HE-SIG-A | Bit | Field | Number of bits | Description |
|---|---|---|---|---|
| | B19-B20 | Bandwidth | 2 | For an HE SU PPDU:<br>Set to 0 for 20 MHz<br>Set to 1 for 40 MHz<br>Set to 2 for 80 MHz<br>Set to 3 for 160 MHz and 80+80 MHz<br>For an HE ER SU PPDU:<br>Set to 0 for 242-tone RU<br>Set to 1 for upper frequency 106-tone RU within the primary 20 MHz<br>Values 2 and 3 are reserved |
| | B21-B22 | GI + LTF Size | 2 | Indicates the GI duration and HE-LTF size.<br>Set to 0 to indicate a 1× HE-LTF and 0.8 μs GI<br>Set to 1 to indicate a 2× HE-LTF and 0.8 μs GI<br>Set to 2 to indicate a 2× HE-LTF and 1.6 μs GI<br>Set to 3 to indicate:<br>  a 4× HE-LTF and 0.8 μss GI if both the DCM and STBC fields are 1. Neither DCM nor STBC shall be applied if(#Ed) both the DCM and STBC fields arc set to 1.<br>  a 4× HE-LTF and 3.2 μss GI, otherwise |
| | B23-B25 | NSTS And Midamble Periodicity | 3 | If the Doppler field is 0, indicates the number of space-time streams.<br>Set to the number of space-time streams minus 1<br>For an HE ER SU PPDU, values 2 to 7 are reserved<br>If the Doppler field is 1, then B23-B24 indicates the number of space time streams, up to 4, and B25 indicates the midamble periodicity.<br>B23-B24 is set to the number of space time streams minus 1.<br>For an HE ER SU PPDU, values 2 and 3 are reserved<br>B25 is set to 0 if TXVECTOR parameter MIDAMBLE_PERIODICTY is 10 and set to 1 if TXVECTOR parameter MIDAMBLE_PERIODICITY is 20. |
| HE-SIG-A2(HE SU PPDU)or HE-SIG-AS (HE ER SU PPDU) | B0-B6 | TXOP | 7 | Set to 127 to indicate no duration information if(#15491) TXVECTOR parameter TXOP_DURATION is set to UNSPECIFIED.<br>Set to a value less than 127 to indicate duration information for NAV setting and protection of the TXOP as follows:<br>  If TXVECTOR parameter TXOP_DURATION is less than 512, then B0 is set to 0 and B1-B6 is set to floor(TXOP_DURATION/8)(#16277).<br>  Otherwise, B0 is set to 1 and B1-B6 is set to floor ((TXOP_DURATION − 512 ) / 128)(#16277).<br>where(#16061)<br>  B0 indicates the TXOP length granularity. Set to 0 for 8 μs: otherwise set to 1 for 128 μs.<br>  B1-B6 indicates the scaled value of the TXOP DURATION |
| | B7 | Coding | 1 | Indicates whether BCC or LDPC is used:<br>Set to 0 to indicate BCC<br>Set to 1 to indicate LDPC |
| | B8 | LDPC Extra Symbol Segment | 1 | Indicates the presence of the extra OFDM symbol segment for LDPC:<br>Set to 1 if an extra OFDM symbol segment for LDPC is present<br>Set to 0 if an extra OFDM symbol segment for LDPC is not present<br>Reserved and set to 1 if the Coding field is set to 0(#15492). |
| | B9 | STBC | 1 | If the DCM field is set to 0, then set to 1 if space time block coding is used. Neither DCM nor STBC shall be applied if(#15493) both the DCM field and STBC field are set to 1.<br>Set to 0 otherwise. |
| | B10 | Beamformed (#16038) | 1 | Set to 1 if a beamforming steering matrix is applied to the waveform in an SU transmission.<br>Set to 0 otherwise. |
| | B11-B12 | Pre-FEC Padding Factor | 2 | Indicates the pre-FEC padding factor.<br>Set to 0 to indicate a pre-FEC padding factor of 4<br>Set to 1 to indicate a pre-FEC padding factor of 1<br>Set to 2 to indicate a pre-FEC padding factor of 2<br>Set to 3 to indicate a pre-FEC padding factor of 3 |
| | B13 | PE Disambiguity | 1 | Indicates PE disambiguity(#16274) as defined in 28.3.12 (Packet extension). |

TABLE 1-continued

| Two Parts of HE-SIG-A | Bit | Field | Number of bits | Description |
|---|---|---|---|---|
| | B14 | Reserved | 1 | Reserved and set to 1 |
| | B15 | Doppler | 1 | Set to 1 if one of the following applies:<br>The number of OFDM symbols in the Data field is larger than the signaled midamble periodicity plus 1 and the midamble is present<br>The number of OFDM symbols in the Data field is less than or equal to the signaled midamble periodicity plus 1 (see 28.3.11.16 Midamble), the midamble is not present, but the channel is fast varying. It recommends that midamble may be used for the PPDUs of the reverse link.<br>Set to 0 otherwise. |
| | B16-B19 | CRC | 4 | CRC for bits 0-41 of the HE-SIG-A field (see 28.3.10.7.3 (CRC computation)). Bits 0-41 of the HE-SIG-A field correspond to bits 0-25 of HE-SIG-A followed by bits 0-15 of HE-SIG-A2). |
| | B20-B25 | Tail | 6 | Used to terminate the trellis of the convolutional decoder.<br>Set to 0. |

In addition, the HE-SIG-A field of the HE MU PPDU may be defined as follows.

TABLE 2

| Two Parts of HE-SIG-A | Bit | Field | Number of bits | Description |
|---|---|---|---|---|
| HE-SIG-A1 | B0 | UL/DL | 1 | Indicates whether the PPDU is sent UL or DL. Set to the value indicated by the TXVECTOR parameter UPLINK_FLAG.(# 16805)<br>NOTE The TDLS peer can identify the TDLS frame by To DS and From DS fields in the MAC header of the MPDU. |
| | B1-B3 | SIGB MCS | 3 | Indicates the MCS of the HE-SIG-B field:<br>Set to 0 for MCS 0<br>Set to 1 for MCS 1<br>Set to 2 for MCS 2<br>Set to 3 for MCS 3<br>Set to 4 for MCS 4<br>Set to 5 for MCS 5<br>The values 6 and 7 are reserved |
| | B4 | SIGB DCM | 1 | Set to 1 indicates that the HE-SIG-B is modulated with DCM for the MCS.<br>Set to 0 indicates that the HE-SIG-B is not modulated with DCM for the MCS.<br>NOTE DCM is only applicable to MCS 0, MCS 1, MCS 3, and MCS 4. |
| | B5-B10 | BSS Color | 6 | The BSS Color field is an identifier of the BSS.<br>Set to the value of the TXVECTOR parameter BSS_COLOR. |
| | B11-B14 | Spatial Reuse | 4 | Indicates whether or not spatial reuse is allowed during the transmission of this PPDU(#16806).<br>Set to the value of the SPATIAL_REUSE parameter of the TXVECTOR, which contains a value from Table 28-21 (Spatial Reuse field encoding for an HE SU PPDU, HE FR SU PPDU, and HE MU PPDU) (see 27.11.6 (SPATIAL_REUSE)).<br>Set to SRP_DISALLOW to prohibit SRP-based spatial reuse during this PPDU. Set to SRP AND NON S-RG_OBSS_PD_PROHTBITED to prohibit both SRP-based spatial reuse and non-SRG OBSS PD-based spatial reuse during this PPDU. For the interpretation of other values see 27.11.6 (SPATIAL_REUSE) and 27.9 (Spatial reuse operation). |
| | B15-B17 | Bandwidth | 3 | Set to 0 for 20 MHz.<br>Set to 1 for 40 MHz.<br>Set to 2 for 80 MHz non-preamble puncturing mode.<br>Set to 3 for 160 MHz and 80 + 80 MHz non-preamble puncturing mode. |

TABLE 2-continued

| Two Parts of HE-SIG-A | Bit | Field | Number of bits | Description |
|---|---|---|---|---|
| | | | | If the SIGB Compression field is 0:<br>　Set to 4 for preamble puncturing in 80 MHz, where in the preamble only the secondary 20 MHz is punctured.<br>　Set to 5 for preamble puncturing in 80 MHz, where in the preamble only one of the two 20 MHz subchannels in secondary 40 MHz is punctured.<br>　Set to 6 for preamble puncturing in 160 MHz or 80 + 80 MHz, where in the primary 80 MHz of the preamble only the secondary 20 MHz is punctured.<br>　Set to 7 for preamble puncturing in 160 MHz or 80 + 80 MHz, where in the primary 80 MHz of the preamble the primary 40 MHz is present.<br>If the SIGB Compression field is 1 then values 4-7 are reserved. |
| | B18-B21 | Number Of HE-SIG-B Symbols Or MU-MTMO Users | 4 | If the HE-SIG-B Compression field is set to 0, indicates<br>the number of OFDM symbols in the HE-SIG-B field:(#15494)<br>　Set to the number of OFDM symbols in the HE-SIG-B field minus 1 if the number of OFDM symbols in the HE-SIG-B field is less than 16;<br>　Set to 15 to indicate that the number of OFDM symbols in the HE-SIG-B field is equal to 16 if Longer Than 16 HE SIG-B OFDM Symbols Support subfield of the HE Capabilities element transmitted by at least one recipient STA is 0;<br>　Set to 15 to indicate that the number of OFDM symbols in the HE-SIG-B field is greater than or equal to 16 if the Longer Than 16 HE SIG-B OFDM Symbols Support subfield of the HE Capabilities element transmitted by all the recipient STAs are 1 and if the HE-SIG-B data rate is less than MCS 4 without DCM. The exact number of OFDM symbols in the HE-SIG-B field is calculated based on the number of User fields in the HE-SIG-B content channel which is indicated by HE-SIG-B common field in this case.<br>If the HE-SIG-B Compression field is set to 1, indicates<br>the number of MU-MIMO users and is set to the number of NU-MIMO users minus 1(#15495). |
| | B22 | SIGB Compression | 1 | Set to 0 if the Common field in HE-SIG-B is present.<br>Set to 1 if the Common field in HE-SIG-B is not present(#16139) |
| | B23-B24 | GI + LTF Size | 2 | Indicates the GI duration and HE-LTF size:<br>　Set to 0 to indicate a 4× HE-LTF and 0.8 μs GI<br>　Set to 1 to indicate a 2× HE-LTF and 0.8 μs GI<br>　Set to 2 to indicate a 2× HE-LTF and 1.6 μs GI<br>　Set to 3 to indicate a 4× HE-LTF and 3.2 μs GI |
| | B25 | Doppler | 1 | Set to 1 if one of the following applies:<br>　The number of OFDM symbols in the Data field is larger than the signaled midamble periodicity plus 1 and the midamble is present<br>　The number of OFDM symbols in the Data field is less than or equal to the signaled midamble periodicity plus 1 (see 28.3.11.16 Midamble), the midamble is not present, but the channel is fast varying. It recommends that midamble may be used for the PPDUs of the reverse link.<br>Set to 0 otherwise. |
| HE-SIG-A2 | B0-B6 | TXOP | 7 | Set to 127 to indicate no duration information if(#15496) TXVECTOR parameter TXOP_DURATION is set to UNSPECIFIED.<br>Set to a value less than 127 to indicate duration information for NAV setting and protection of the TXOP as follows:<br>　If TXVECTOR parameter TXOP_DURATION is less than 512, then B0 is set to 0 and B1-B6 is set to floor(TXOP_DURATION/8)(#16277).<br>　Otherwise, B0 is set to 1 and B1-B6 is set to floor ((TXOP_DURATION − 512 )/ 128)(#16277).<br>where)#16061;<br>　B0 indicates the TXOP length granularity. Set to 0 for 8 μs; otherwise set to 1 for 128 μs.<br>　B1-B6 indicates the scaled value of the TXOP_DURATION |

TABLE 2-continued

| Two Parts of HE-SIG-A | Bit | Field | Number of bits | Description |
|---|---|---|---|---|
| | B7 | Reserved | 1 | Reserved and set to 1 |
| | B8-B10 | Number of HE-LTF Symbols And Midamble Periodicity | 3 | If the Doppler field is set to 0(#15497), indicates the number of HE-LTF symbols:<br>    Set to 0 for 1 HE-LTF symbol<br>    Set to 1 for 2 HE-LTF symbols<br>    Set to 2 for 4 HE-LTF symbols<br>    Set to 3 for 6 HE-LTF symbols<br>    Set to 4 for 8 HE-LTF symbols<br>    Other values are reserved.<br>If the Doppler field is set to 1(#15498), B8-B9 indicates the number of HE-LTF symbols(#16056) and B10 indicates midamble periodicity:<br>B8-B9 is encoded as follows:<br>    0 indicates 1 HE-LTF symbol<br>    1 indicates 2 HE-LTF symbols<br>    2 indicates 4 HE-LTF symbols<br>    3 is reserved<br>B10 is set to 0 if the TXVECTOR parameter MIDAMBLE_PERIODICITY is 10 and set to 1 if the TXVECTOR parameter PREAMBLE_PERIODICITY is 20. |
| | B11 | LDPC Extra Symbol Segment | 1 | Indication of the presence of the extra OFDM symbol segment for LDPC.<br>    Set to 1 if an extra OFDM symbol segment for LDPC is present.<br>    Set to 0 otherwise. |
| | B12 | STBC | 1 | In an HE MU PPDU where each RU includes no more than 1 user, set to 1 to indicate all RUs are STBC encoded in the payload, set to 0 to indicate all RUs are not STBC encoded in the payload.<br>STBC does not apply to HE-SIG-B.<br>STBC is not applied if one or more RUs are used for MU-MIMO allocation.(#15661) |
| | B13-B14 | Pre-FEC Padding Factor | 2 | Indicates the pre-FEC padding factor.<br>Set to 0 to indicate a pre-FEC padding factor of 4<br>Set to 1 to indicate a pre-FEC padding factor of 1<br>Set to 2 to indicate a pre-FEC padding factor of 2<br>Set to 3 to indicate a pre-FEC padding factor of 3 |
| | B15 | PE Disambiguity | 1 | Indicates PE disambiguity(#16274) as defined in 28.3.12 (Packet extension). |
| | B16-B19 | CRC | 4 | CRC for bits 0-41 of the HE-SIG-A field (see 28.3.10.7.3 (CRC computation)). Bits 0-41 of the HE-SIG-A field correspond to bits 0-25 of HE-SIG-A1 followed by bits 0-15 of HE-SIG-A2). |
| | B20-B25 | Tail | 6 | Used to terminate the trellis of the convolutional decoder.<br>Set to 0. |

In addition, the HE-SIG-A field of the HE TB PPDU may be defined as follows.

TABLE 3

| Two Parts of HE-SIG-A | Bit | Field | Number of bits | Description |
|---|---|---|---|---|
| HE-SIG-A1 | B0 | Format | 1 | Differentiate an HE SU PPDU and HE ER SU PPDU from an HE TB PPDU:<br>    Set to 0 for an HE TB PPDU |
| | B1-B6 | BSS Color | 6 | The BSS Color field is an identifier of the BSS.<br>Set to the value of the TXVECTOR parameter BSS_COLOR. |
| | B7-B10 | Spatial Reuse 1 | 4 | Indicates whether or not spatial reuse is allowed in a subband of the PPDU during the transmission of this PPDU, and if allowed, indicates a value that is used to determine a limit on the transmit power of a spatial reuse transmission.<br>If the Bandwidth field indicates 20 MHz, 40 MHz, or 80 MHz then this Spatial Reuse field applies to the first 20 MHz subband.<br>If the Bandwidth field indicates 160/80 + 80 MHz then this Spatial Reuse field applies to the first 40 MHz subband of the 160 MHz operating band.<br>Set to the value of the SPATIAL_REUSE(1) parameter of the TXVECTOR, which contains a value from |

TABLE 3-continued

| Two Parts of HE-SIG-A | Bit | Field | Number of bits | Description |
|---|---|---|---|---|
| | | | | Table 28-22 (Spatial Reuse field encoding for an HE TB PPDU) for an HE TB PPDU (see 27.11.6 (SPATIAL_REUSE)). Set to SRP_DISALLOW to prohibit SRP-based spatial reuse during this PPDU. Set to SRP_AND_NON_S-RG_OBSS_PD_PROHIBITED to prohibit both SRP-based spatial reuse and non-SRG OBSS PD-based spatial reuse during this PPDU. For the interpretation of other values see 27.11.6 (SPATIAL_REUSE) and 27.9 (Spatial reuse operation). |
| | B11-B14 | Spatial Reuse 2 | 4 | Indicates whether or not spatial reuse is allowed in a subband of the PPDU during the transmission of this PPDU, and if allowed, indicates a value that is used to determine a limit on the transmit power of a spatial reuse transmission. If the Bandwidth field indicates 20 MHz. 40 MHz, or 80 MHz: This Spatial Reuse field applies to the second 20 MHz subband. If(#Ed) the STA operating channel width is 20 MHz, then this field is set to the same value as Spatial Reuse 1 field. If(#Ed) the STA operating channel width is 40 MHz in the 2.4 GHz band, this field is set to the same value as Spatial Reuse 1 field. If the Bandwidth field indicates 160/80 + 80 MHz the this Spatial Reuse field applies to the second 40 MHz subband of Ihe 160 MHz operating band. Set to the value of the SPATIAL _REUSE(2) parameter of the TXVECTOR, which contains a value from Table 28-22 (Spatial Reuse field encoding for an HE TB PPDU) for an HE TB PPDU (see 27.11.6 (SPATIAL_REUSE)). Set to SRP_DISALLOW to prohibit SRP-based spatial reuse during this PPDU. Set to SRP_AND_NON_S-RG_OBSS_PD_PROHIBITED to prohibit both SRP-based spatial reuse and non-SRG OBSS PD-based spatial reuse during this PPDU. For the interpretation of other values see 27.11.6 (SPATIAL_REUSE) and 27.9 (Spatial reuse operation). |
| | B15-B18 | Spatial Reuse 3 | 4 | Indicates whether or not spatial reuse is allowed in a subband of the PPDU during the transmission of this PPDU, and if allowed, indicates a value that is used to determine a limit on the transmit power of a spatial reuse transmission. If the Bandwidth field indicates 20 MHz, 40 MHz or 80 MHz: This Spatial Reuse field applies to the third 20 MHz subband. If(#Ed) the STA operating channel width is 20 MHz or 40 MHz, this field is set to the same value as Spatial Reuse 1 field. If the Bandwidth field indicates 160/80 + 80 MHz: This Spatial Reuse field applies to the third 40 MHz subband of the 160 MHz operating band. If(#Ed) the STA operating channel width is 80 + 80 MHz, this field is set to the same value as Spatial Reuse 1 field. Set to the value of the SPATIAL_REUSE(3) parameter of the TXVECTOR, which contains a value from Table 28-22 ( Spatial Reuse field encoding for an HE TB PPDU) for an HE TB PPDU (see 27.11.6 (SPATIAL_REUSE)). Set to SRP_DISALLOW to prohibit SRP-based spatial reuse during this PPDU. Set to SRP AND NON S-RG_OBSS_PD_PROHIBITED to prohibit both SRP-based spatial reuse and non-SRG OBSS PD-based spatial reuse during this PPDU. For the interpretation of other values see 27.11.6 (SPATIAL_REUSE) and 27.9 (Spatial reuse operation). |
| | B19-B22 | Spatial Reuse 4 | 4 | Indicates whether or not spatial reuse is allowed in a subband of the PPDU during the transmission of this PPDU, and if allowed, indicates a value that is used to determine a limit on the transmit power of a spatial reuse transmission. |

TABLE 3-continued

| Two Parts of HE-SIG-A | Bit | Field | Number of bits | Description |
|---|---|---|---|---|
| | | | | If the Bandwidth Field indicates 20 MHz, 40 MHz or 80 MHz:<br>  This Spatial Reuse field applies to the fourth 20 MHz subband.<br>  If(#Ed) the STA operating channel width is 20 MHz, then this field is set to the same value as Spatial Reuse 1 field.<br>  If(#Ed) the STA operating channel width is 40 MHz, then this field is set to the same value as Spatial Reuse 2 field.<br>If the Bandwidth field indicates 160/80 + 80 MHz:<br>  This Spatial Reuse field applies to the fourth 40 MHz subband of the 160 MHz operating band.<br>  If(#Ed) the STA operating channel width is 80 + 80 MHz, then this field is set to same value as Spatial Reuse 2 field.<br>Set to the value of the SPATIAL_REUSE(4) parameter of the TXVECTOR, which contains a value from Table 28-22 (Spatial Reuse field encoding for an HE TB PPDU) for an HE TB PPDU (see 27.11.6 (SPATIAL_REUSE))<br>Set to SRP_DISALLOW to prohibit SRP-based spatial reuse during this PPDU. Set to SRP AND NON S-RG_OBSS_PD_PROHIBITED to prohibit both SRP-based spatial reuse and non-SRG OBSS PD-based spatial reuse during this PPDU. For the interpretation of other values see 27.11.6 (SPATIAL REUSE) and 27.9 (Spatial reuse operation). |
| | B23 | Reserved | 1 | Reserved and set to 1.<br>NOTE Unlike other Reserved fields in HE-SIG-A of the HE TB PPDU, B23 does not have a corresponding bit in the Trigger frame. |
| | B24-B25 | Bandwidth | 2 | (#16003 (Set to 0 for 20 MHz<br>Set to 1 for 40 MHz<br>Set to 2 for 80 MHz<br>Set to 3 for 160 MHz and 80 + 80 MHz |
| HE-SIG-A2 | B0-B6 | TXOP | 7 | Set to 127 to indicate no duration information if(#15499) TXVECTOR parameter TXOP_DURATION is set to UNSPECIFIED.<br>Set to a value less than 127 to indicate duration information for NAV setting and protection of the TXOP as follows:<br>  If TXVECTOR parameter TXOP_DURATION is less than 512, then B0 is set to 0 and B1-B6 is set to floor(TXOP_DURATION/8)(#16277).<br>  Otherwise, B0 is set to 1 and B1-B6 is set to floor ((TXOP_DURATION − 512 ) / 128)(#16277).<br>where(#16061)<br>  B0 indicates the TXOP length granularity. Set to 0 for 8 μs: otherwise set to 1 for 128 μs.<br>  B1-B6 indicates the scaled value of the TXOP DURATION |
| | B7-B15 | Reserved | 9 | Reserved and set to value indicated in the UL HE-SIG-A2 Reserved subfield in the Trigger frame. |
| | B16-B19 | CRC | 4 | CRC of bits 0-41 of the HE-SIG-A field. See 28.3.10.7.3 (CRC computation). Bits 0-41 of the HE-SIG-A field correspond to bits 0-25 of HE-SIG-A1 followed by bits 0-15 of HE-SIG-A2). |
| | B20-B25 | Tail | 6 | Used to terminate the trellis of Ure convolutional decoder.<br>Set to 0. |

An HE-SIG-B 740 may be included only in the case of the PPDU for the multiple users (MUs) as described above. Principally, an HE-SIG-A 750 or an HE-SIG-B 760 may include resource allocation information (or virtual resource allocation information) for at least one receiving STA.

Figure 8:
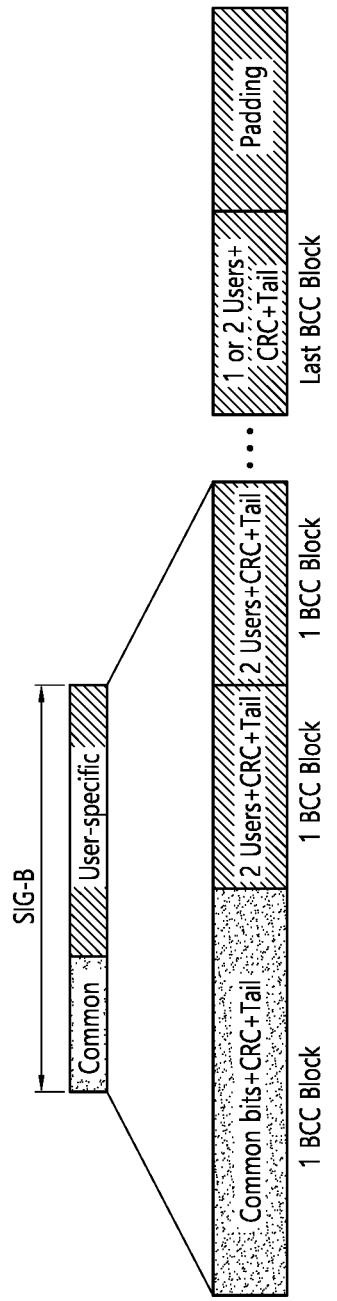
FIG. 8 is a block diagram illustrating one example of HE-SIG-B according to an embodiment.

FIG. 8 is a block diagram illustrating one example of HE-SIG-B according to an embodiment.

As illustrated in FIG. 8, the HE-SIG-B field includes a common field at the foremost part and the corresponding common field is separated from a field which follows therebehind to be encoded. That is, as illustrated in FIG. 8, the HE-SIG-B field may include a common field including the common control information and a user-specific field including user-specific control information. In this case, the common field may include a CRC field corresponding to the common field, and the like and may be coded to be one BCC block. The user-specific field subsequent thereafter may be coded to be one BCC block including the "user-specific field" for 2 users and a CRC field corresponding thereto as illustrated in FIG. 8.

A previous field of the HE-SIG-B 740 may be transmitted in a duplicated form on a MU PPDU. In the case of the HE-SIG-B 740, the HE-SIG-B 740 transmitted in some frequency band (e.g., a fourth frequency band) may even include control information for a data field corresponding to a corresponding frequency band (that is, the fourth frequency band) and a data field of another frequency band (e.g., a second frequency band) other than the corresponding frequency band. Further, a format may be provided, in which the HE-SIG-B 740 in a specific frequency band (e.g., the second frequency band) is duplicated with the HE-SIG-B 740 of another frequency band (e.g., the fourth frequency band). Alternatively, the HE-SIG B 740 may be transmitted in an encoded form on all transmission resources. A field after the HE-SIG B 740 may include individual information for respective receiving STAs receiving the PPDU.

The HE-STF 750 may be used for improving automatic gain control estimation in a multiple input multiple output (MIMO) environment or an OFDMA environment.

The HE-LTF 760 may be used for estimating a channel in the MIMO environment or the OFDMA environment.

The size of fast Fourier transform (FFT)/inverse fast Fourier transform (IFFT) applied to the HE-STF 750 and the field after the HE-STF 750, and the size of the FFT/IFFT applied to the field before the HE-STF 750 may be different from each other. For example, the size of the FFT/IFFT applied to the HE-STF 750 and the field after the HE-STF 750 may be four times larger than the size of the FFT/IFFT applied to the field before the HE-STF 750.

For example, when at least one field of the L-STF 700, the L-LTF 710, the L-SIG 720, the HE-SIG-A 730, and the HE-SIG-B 740 on the PPDU of FIG. 7 is referred to as a first field, at least one of the data field (770), the HE-STF 750, and the HE-LTF 760 may be referred to as a second field. The first field may include a field associated with a legacy system and the second field may include a field associated with an HE system. In this case, the fast Fourier transform (FFT) size and the inverse fast Fourier transform (IFFT) size may be defined as a size which is N (N is a natural number, e.g., N=1, 2, and 4) times larger than the FFT/IFFT size used in the legacy wireless LAN system. That is, the FFT/IFFT having the size may be applied, which is N (=4) times larger than the first field of the HE PPDU. For example, 256 FFT/IFFT may be applied to a bandwidth of 20 MHz, 512 FFT/IFFT may be applied to a bandwidth of 40 MHz, 1024 FFT/IFFT may be applied to a bandwidth of 80 MHz, and 2048 FFT/IFFT may be applied to a bandwidth of continuous 160 MHz or discontinuous 160 MHz.

In other words, a subcarrier space/subcarrier spacing may have a size which is 1/N times (N is the natural number, e.g., N=4, the subcarrier spacing is set to 78.125 kHz) the subcarrier space used in the legacy wireless LAN system. That is, subcarrier spacing having a size of 312.5 kHz, which is legacy subcarrier spacing may be applied to the first field of the HE PPDU and a subcarrier space having a size of 78.125 kHz may be applied to the second field of the HE PPDU.

Alternatively, an IDFT/DFT period applied to each symbol of the first field may be expressed to be N (=4) times shorter than the IDFT/DFT period applied to each data symbol of the second field. That is, the IDFT/DFT length applied to each symbol of the first field of the HE PPDU may be expressed as 3.2 μs and the IDFT/DFT length applied to each symbol of the second field of the HE PPDU may be expressed as 3.2 μs*4 (=12.8 μs). The length of the OFDM symbol may be a value acquired by adding the length of a guard interval (GI) to the IDFT/DFT length. The length of the GI may have various values such as 0.4 μs, 0.8 μs, 1.6 μs, 2.4 μs, and 3.2 μs.

For simplicity in the description, in FIG. 7, it is expressed that a frequency band used by the first field and a frequency band used by the second field accurately coincide with each other, but both frequency bands may not completely coincide with each other, in actual. For example, a primary band of the first field (L-STF, L-LTF, L-SIG, HE-SIG-A, and HE-SIG-B) corresponding to the first frequency band may be the same as the most portions of a frequency band of the second field (HE-STF, HE-LTF, and Data), but boundary surfaces of the respective frequency bands may not coincide with each other. As illustrated in FIGS. 4 to 6, since multiple null subcarriers, DC tones, guard tones, and the like are inserted during arranging the RUs, it may be difficult to accurately adjust the boundary surfaces.

The user (e.g., a receiving station) may receive the HE-SIG-A 730 and may be instructed to receive the downlink PPDU based on the HE-SIG-A 730. In this case, the STA may perform decoding based on the FFT size changed from the HE-STF 750 and the field after the HE-STF 750. On the contrary, when the STA may not be instructed to receive the downlink PPDU based on the HE-SIG-A 730, the STA may stop the decoding and configure a network allocation vector (NAV). A cyclic prefix (CP) of the HE-STF 750 may have a larger size than the CP of another field and the during the CP period, the STA may perform the decoding for the downlink PPDU by changing the FFT size.

Hereinafter, in the embodiment of the present disclosure, data (or or a frame) which the AP transmits to the STA may be expressed as a terms called downlink data (or a downlink frame) and data (or a frame) which the STA transmits to the AP may be expressed as a term called uplink data (or an uplink frame). Further, transmission from the AP to the STA may be expressed as downlink transmission and transmission from the STA to the AP may be expressed as a term called uplink transmission.

In addition, a PHY protocol data unit (PPDU), a frame, and data transmitted through the downlink transmission may be expressed as terms such as a downlink PPDU, a downlink frame, and downlink data, respectively. The PPDU may be a data unit including a PPDU header and a physical layer service data unit (PSDU) (or a MAC protocol data unit (MPDU)). The PPDU header may include a PHY header and a PHY preamble and the PSDU (or MPDU) may include the frame or indicate the frame (or an information unit of the MAC layer) or be a data unit indicating the frame. The PHY header may be expressed as a physical layer convergence protocol (PLCP) header as another term and the PHY preamble may be expressed as a PLCP preamble as another term.

Further, a PPDU, a frame, and data transmitted through the uplink transmission may be expressed as terms such as an uplink PPDU, an uplink frame, and uplink data, respectively.

In the wireless LAN system to which the embodiment of the present description is applied, the total bandwidth may be used for downlink transmission to one STA and uplink transmission to one STA. Further, in the wireless LAN system to which the embodiment of the present description is applied, the AP may perform downlink (DL) multi-user (MU) transmission based on multiple input multiple output (MU MIMO) and the transmission may be expressed as a term called DL MU MIMO transmission.

In addition, in the wireless LAN system according to the embodiment, an orthogonal frequency division multiple access (OFDMA) based transmission method is preferably supported for the uplink transmission and/or downlink transmission. That is, data units (e.g., RUs) corresponding to different frequency resources are allocated to the user to perform uplink/downlink communication. Specifically, in the wireless LAN system according to the embodiment, the AP may perform the DL MU transmission based on the OFDMA and the transmission may be expressed as a term called DL MU OFDMA transmission. When the DL MU OFDMA transmission is performed, the AP may transmit the downlink data (or the downlink frame and the downlink PPDU) to the plurality of respective STAs through the plurality of respective frequency resources on an overlapped time resource. The plurality of frequency resources may be a plurality of subbands (or subchannels) or a plurality of resource units (RUs). The DL MU OFDMA transmission may be used together with the DL MU MIMO transmission. For example, the DL MU MIMO transmission based on a plurality of space-time streams (or spatial streams) may be performed on a specific subband (or subchannel) allocated for the DL MU OFDMA transmission.

Further, in the wireless LAN system according to the embodiment, uplink multi-user (UL MU) transmission in which the plurality of STAs transmits data to the AP on the same time resource may be supported. Uplink transmission on the overlapped time resource by the plurality of respective STAs may be performed on a frequency domain or a spatial domain.

When the uplink transmission by the plurality of respective STAs is performed on the frequency domain, different frequency resources may be allocated to the plurality of respective STAs as uplink transmission resources based on the OFDMA. The different frequency resources may be different subbands (or subchannels) or different resources units (RUs). The plurality of respective STAs may transmit uplink data to the AP through different frequency resources. The transmission method through the different frequency resources may be expressed as a term called a UL MU OFDMA transmission method.

When the uplink transmission by the plurality of respective STAs is performed on the spatial domain, different time-space streams (or spatial streams) may be allocated to the plurality of respective STAs and the plurality of respective STAs may transmit the uplink data to the AP through the different time-space streams. The transmission method through the different spatial streams may be expressed as a term called a UL MU MIMO transmission method.

The UL MU OFDMA transmission and the UL MU MIMO transmission may be used together with each other. For example, the UL MU MIMO transmission based on the plurality of space-time streams (or spatial streams) may be performed on a specific subband (or subchannel) allocated for the UL MU OFDMA transmission.

In the legacy wireless LAN system which does not support the MU OFDMA transmission, a multi-channel allocation method is used for allocating a wider bandwidth (e.g., a 20 MHz excess bandwidth) to one terminal. When a channel unit is 20 MHz, multiple channels may include a plurality of 20 MHz-channels. In the multi-channel allocation method, a primary channel rule is used to allocate the wider bandwidth to the terminal. When the primary channel rule is used, there is a limit for allocating the wider bandwidth to the terminal. Specifically, according to the primary channel rule, when a secondary channel adjacent to a primary channel is used in an overlapped BSS (OBSS) and is thus busy, the STA may use remaining channels other than the primary channel. Therefore, since the STA may transmit the frame only to the primary channel, the STA receives a limit for transmission of the frame through the multiple channels. That is, in the legacy wireless LAN system, the primary channel rule used for allocating the multiple channels may be a large limit in obtaining a high throughput by operating the wider bandwidth in a current wireless LAN environment in which the OBSS is not small.

In order to solve the problem, in the embodiment, a wireless LAN system is disclosed, which supports the OFDMA technology. That is, the OFDMA technique may be applied to at least one of downlink and uplink. Further, the MU-MIMO technique may be additionally applied to at least one of downlink and uplink. When the OFDMA technique is used, the multiple channels may be simultaneously used by not one terminal but multiple terminals without the limit by the primary channel rule. Therefore, the wider bandwidth may be operated to improve efficiency of operating a wireless resource.

As described above, in case the uplink transmission performed by each of the multiple STAs (e.g., non-AP STAs) is performed within the frequency domain, the AP may allocate different frequency resources respective to each of the multiple STAs as uplink transmission resources based on OFDMA. Additionally, as described above, the frequency resources each being different from one another may correspond to different subbands (or sub-channels) or different resource units (RUs).

The different frequency resources respective to each of the multiple STAs are indicated through a trigger frame.

Figure 9:
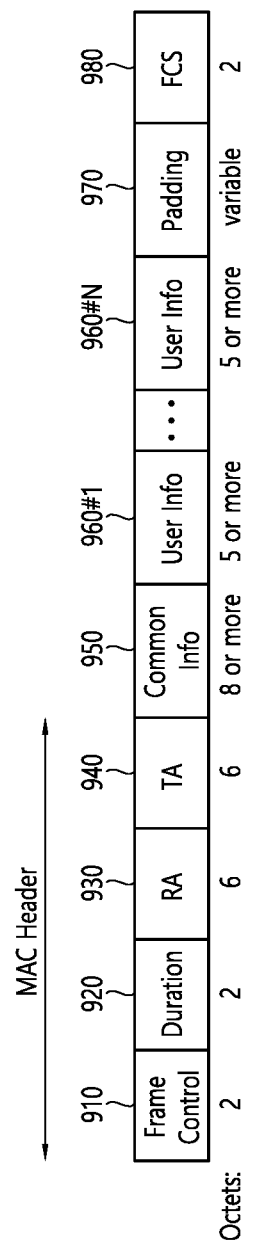
FIG. 9 illustrates an example of a trigger frame.

FIG. 9 illustrates an example of a trigger frame. The trigger frame of FIG. 9 allocates resources for Uplink Multiple-User (MU) transmission and may be transmitted from the AP. The trigger frame may be configured as a MAC frame and may be included in the PPDU. For example, the trigger frame may be transmitted through the PPDU shown in FIG. 3, through the legacy PPDU shown in FIG. 2, or through a certain PPDU, which is newly designed for the corresponding trigger frame. In case the trigger frame is transmitted through the PPDU of FIG. 3, the trigger frame may be included in the data field shown in the drawing.

Each of the fields shown in FIG. 9 may be partially omitted, or other fields may be added. Moreover, the length of each field may be varied differently as shown in the drawing.

A Frame Control field (910) shown in FIG. 9 may include information related to a version of the MAC protocol and other additional control information, and a Duration field (920) may include time information for configuring a NAV or information related to an identifier (e.g., AID) of the user equipment.

Also, the RA field (930) includes address information of a receiving STA of the corresponding trigger frame and may be omitted if necessary. The TA field (940) includes address information of a STA triggering the corresponding trigger frame (for example, an AP), and the common information field (950) includes common control information applied to a receiving STA that receives the corresponding trigger frame. For example, a field indicating the length of the L-SIG field of the UL PPDU transmitted in response to the corresponding trigger frame or information controlling the content of the SIG-A field (namely, the HE-SIG-A field) of the UL PPDU transmitted in response to the corresponding trigger frame may be included. Also, as common control information, information on the length of the CP of the UP PPDU transmitted in response to the corresponding trigger frame or information on the length of the LTF field may be included.

Also, it is preferable to include a per user information field (960 #1 to 960 #N) corresponding to the number of receiving STAs that receive the trigger frame of FIG. 9. The per user information field may be referred to as an "RU allocation field".

Also, the trigger frame of FIG. 9 may include a padding field (970) and a frame check sequence field (980).

It is preferable that each of the per user information fields (960 #1 to 960 #N) shown in FIG. 9 includes a plurality of subfields.

Figure 10:
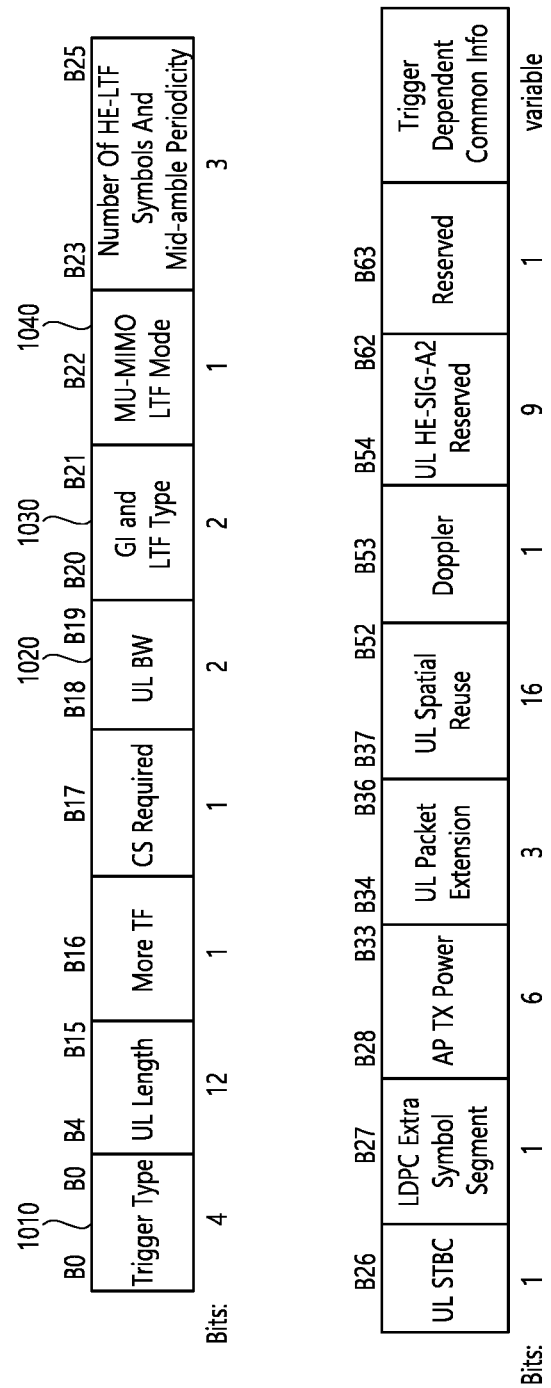
FIG. 10 illustrates an example of a common information field.

FIG. 10 illustrates an example of a common information field. Among the subfields of FIG. 10, some may be omitted, and other additional subfields may also be added. Additionally, the length of each of the subfields shown in the drawing may be varied.

The trigger type field (1010) of FIG. 10 may indicate a trigger frame variant and encoding of the trigger frame variant. The trigger type field (1010) may be defined as follows.

TABLE 4

| Trigger Type subfield value | Trigger frame variant |
| --- | --- |
| 0 | Basic |
| 1 | Beamforming Report Poll (BFRP) |
| 2 | MU-BAR |
| 3 | MU-RTS |
| 4 | Buffer Status Report Poll (BSRP) |
| 5 | GCR MU-BAR |
| 6 | Bandwidth Query Report Poll (BQRP) |
| 7 | NDP Feedback Report Poll (NFRP) |
| 8-15 | Reserved |

The UL BW field (1020) of FIG. 10 indicates bandwidth in the HE-SIG-A field of an HE Trigger Based (TB) PPDU. The UL BW field (1020) may be defined as follows.

TABLE 5

| ULBW subfield value | Description |
| --- | --- |
| 0 | 20 MHz |
| 1 | 40 MHz |
| 2 | 80 MHz |
| 3 | 80 + 80 MHz or 160 MHz |

The Guard Interval (GI) and LTF type fields (1030) of FIG. 10 indicate the GI and HE-LTF type of the HE TB PPDU response. The GI and LTF type field (1030) may be defined as follows.

TABLE 6

| GI And LTF field value | Description |
| --- | --- |
| 0 | 1× HE-LTF + 1.6 µs GI |
| 1 | 2× HE-LTF + 1.6 µs GI |
| 2 | 4× HE-LTF + 3.2 µs GI(#15968) |
| 3 | Reserved |

Also, when the GI and LTF type fields (1030) have a value of 2 or 3, the MU-MIMO LTF mode field (1040) of FIG. 10 indicates the LTF mode of a UL MU-MIMO HE TB PPDU response. At this time, the MU-MIMO LTF mode field (1040) may be defined as follows.

If the trigger frame allocates an RU that occupies the whole HE TB PPDU bandwidth and the RU is allocated to one or more STAs, the MU-MIMO LTF mode field (1040) indicates one of an HE single stream pilot HE-LTF mode or an HE masked HE-LTF sequence mode.

If the trigger frame does not allocate an RU that occupies the whole HE TB PPDU bandwidth and the RU is not allocated to one or more STAs, the MU-MIMO LTF mode field (1040) indicates the HE single stream pilot HE-LTF mode. The MU-MIMO LTF mode field (1040) may be defined as follows.

TABLE 7

| MU-MIMO LTF subfield value | Description |
| --- | --- |
| 0 | HE single stream pilot HE-LTF mode |
| 1 | HE masked HE-LTF sequence mode |

Figure 11:
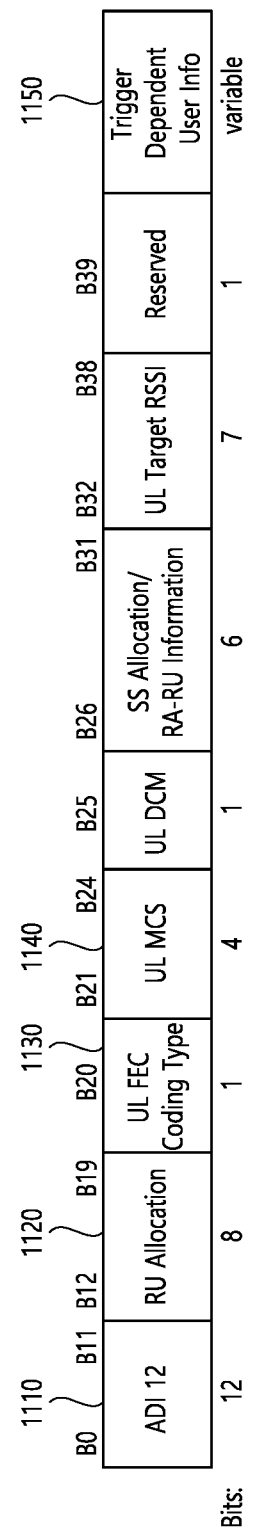
FIG. 11 illustrates an example of a sub-field being included in a per user information field.

FIG. 11 illustrates an example of a subfield being included in a per user information field. Among the subfields of FIG. 11, some may be omitted, and other additional subfields may also be added. Additionally, the length of each of the subfields shown in the drawing may be varied.

The User Identifier field of FIG. 11 (or AID12 field, 1110) indicates the identifier of a STA (namely, a receiving STA) corresponding to per user information, where an example of the identifier may be the whole or part of the AID.

Also, an RU Allocation field (1120) may be included. In other words, when a receiving STA identified by the User Identifier field (1110) transmits a UL PPDU in response to the trigger frame of FIG. 9, the corresponding UL PPDU is transmitted through an RU indicated by the RU Allocation field (1120). In this case, it is preferable that the RU indicated by the RU Allocation field (1120) indicates the RUs shown in FIGS. 4, 5, and 6. A specific structure of the RU Allocation field (1120) will be described later.

The subfield of FIG. 11 may include a (UL FEC) coding type field (1130). The coding type field (1130) may indicate the coding type of an uplink PPDU transmitted in response to the trigger frame of FIG. 9. For example, when BCC coding is applied to the uplink PPDU, the coding type field (1130) may be set to '1', and when LDPC coding is applied, the coding type field (1130) may be set to '0'.

Additionally, the subfield of FIG. 11 may include a UL MCS field (1140). The MCS field (1140) may indicate an MCS scheme being applied to the uplink PPDU that is transmitted in response to the trigger frame of FIG. 9.

Also, the subfield of FIG. 11 may include a Trigger Dependent User Info field (1150). When the Trigger Type field (1010) of FIG. 10 indicates a basic trigger variant, the Trigger Dependent User Info field (1150) may include an MPDU MU Spacing Factor subfield (2 bits), a TID Aggregate Limit subfield (3 bits), a Reserved field (1 bit), and a Preferred AC subfield (2 bits).

Hereinafter, the present disclosure proposes an example of improving a control field included in a PPDU. The control field improved according to the present disclosure includes a first control field including control information required to interpret the PPDU and a second control field including control information for demodulate the data field of the PPDU. The first and second control fields may be used for various fields. For example, the first control field may be the HE-SIG-A 730 of FIG. 7, and the second control field may be the HE-SIG-B 740 shown in FIGS. 7 and 8.

Hereinafter, a specific example of improving the first or the second control field will be described.

In the following example, a control identifier inserted to the first control field or a second control field is proposed. The size of the control identifier may vary, which, for example, may be implemented with 1-bit information.

The control identifier (for example, a 1-bit identifier) may indicate whether a 242-type RU is allocated when, for example, 20 MHz transmission is performed. As shown in FIGS. 4 to 6, RUs of various sizes may be used. These RUs may be divided broadly into two types. For example, all of the RUs shown in FIGS. 4 to 6 may be classified into 26-type RUs and 242-type RUs. For example, a 26-type RU may include a 26-RU, a 52-RU, and a 106-RU while a 242-type RU may include a 242-RU, a 484-RU, and a larger RU.

The control identifier (for example, a 1-bit identifier) may indicate that a 242-type RU has been used. In other words, the control identifier may indicate that a 242-RU, a 484-RU, or a 996-RU is included. If the transmission frequency band in which a PPDU is transmitted has a bandwidth of 20 MHz, a 242-RU is a single RU corresponding to the full bandwidth of the transmission frequency band (namely, 20 MHz). Accordingly, the control identifier (for example, 1-bit identifier) may indicate whether a single RU corresponding to the full bandwidth of the transmission frequency band is allocated.

For example, if the transmission frequency band has a bandwidth of 40 MHz, the control identifier (for example, a 1-bit identifier) may indicate whether a single RU corresponding to the full bandwidth (namely, bandwidth of 40 MHz) of the transmission frequency band has been allocated. In other words, the control identifier may indicate whether a 484-RU has been allocated for transmission in the frequency band with a bandwidth of 40 MHz.

For example, if the transmission frequency band has a bandwidth of 80 MHz, the control identifier (for example, a 1-bit identifier) may indicate whether a single RU corresponding to the full bandwidth (namely, bandwidth of 80 MHz) of the transmission frequency band has been allocated. In other words, the control identifier may indicate whether a 996-RU has been allocated for transmission in the frequency band with a bandwidth of 80 MHz.

Various technical effects may be achieved through the control identifier (for example, 1-bit identifier).

First of all, when a single RU corresponding to the full bandwidth of the transmission frequency band is allocated through the control identifier (for example, a 1-bit identifier), allocation information of the RU may be omitted. In other words, since only one RU rather than a plurality of RUs is allocated over the whole transmission frequency band, allocation information of the RU may be omitted deliberately.

Also, the control identifier may be used as signaling for full bandwidth MU-MIMO. For example, when a single RU is allocated over the full bandwidth of the transmission frequency band, multiple users may be allocated to the corresponding single RU. In other words, even though signals for each user are not distinctive in the temporal and spatial domains, other techniques (for example, spatial multiplexing) may be used to multiplex the signals for multiple users in the same, single RU. Accordingly, the control identifier (for example, a 1-bit identifier) may also be used to indicate whether to use the full bandwidth MU-MIMO described above.

The common field included in the second control field (HE-SIG-B, 740) may include an RU allocation subfield. According to the PPDU bandwidth, the common field may include a plurality of RU allocation subfields (including N RU allocation subfields). The format of the common field may be defined as follows.

TABLE 8

| Subfield | Number of bits | Description |
| --- | --- | --- |
| RU Allocation | N × 8 | Indicates the RU assignment to be used in the data portion in the frequency domain. It also indicates the number of users in each RU. For RUs of size greater than or equal to 106-tones that support MU-MIMO, it indicates the number of users multiplexed using MU-MIMO. Consists of N RU Allocation subfields: N = 1 for a 20 MHz and a 40 MHz HE MU PPDU N = 2 for an 80 MHz HE MU PPDU N = 4 for a 160 MHz or 80 + 80 MHz HE MU PPDU |
| Center 26-tone RU | 1 | This field is present only if(#15510) the value of the Bandwidth field of HE-SIG-A field in an HE MU PPDU is set to greater than 1. If the Bandwidth field of the HE-SIG-A field in an HE MU PPDU is set to 2, 4 or 5 for 80 MHz: Set to 1 to indicate that a user is allocated to the center 26-tone RU (see FIG. 28-7 (RU locations in an 80 MHz HE PPDU(#16528))); otherwise, set to 0. The same value is applied to both HE-SIG-B content channels. If the Bandwidth field of the HE-SIG-A field in an HE MU PPDU is set to 3, 6 or 7 for 160 MHz or 80 + 80 MHz: For HE-SIG-B content channel 1, set to 1 to indicate that a user is allocated to the center 26-tone RU of the lower frequency 80 MHz; otherwise, set to 0. For HE-SIG-B content channel 2, set to 1 to indicate that a user is allocated to the center 26-tone RU of the higher frequency 80 MHz; otherwise, set to 0. |

TABLE 8-continued

| Subfield | Number of bits | Description |
|---|---|---|
| CRC | 4 | See 28.3.10.7.3 (CRC computation) |
| Tail | 6 | Used to terminate the trellis of the convolutional decoder. Set to 0 |

The RU allocation subfield included in the common field of the HE-SIG-B may be configured with 8 bits and may indicate as follows with respect to 20 MHz PPDU bandwidth. RUs to be used as a data portion in the frequency domain are allocated using an index for RU size and disposition in the frequency domain. The mapping between an 8-bit RU allocation subfield for RU allocation and the number of users per RU may be defined as follows.

TABLE 9

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 00000000 | 26 | 26 | 26 | 26 | 26 | 26 | 26 | 26 | 26 | 1 |
| 00000001 | 26 | 26 | 26 | 26 | 26 | 26 | 26 | | 52 | 1 |
| 00000010 | 26 | 26 | 26 | 26 | 26 | 52 | | 26 | 26 | 1 |
| 00000011 | 26 | 26 | 26 | 26 | 26 | 52 | | | 52 | 1 |
| 00000100 | 26 | 26 | 52 | | 26 | 26 | 26 | 26 | 26 | 1 |
| 00000101 | 26 | 26 | 52 | | 26 | 26 | 26 | | 52 | 1 |
| 00000110 | 26 | 26 | 52 | | 26 | 52 | | 26 | 26 | 1 |
| 00000111 | 26 | 26 | 52 | | 26 | 52 | | | 52 | 1 |
| 00001000 | 52 | | 26 | 26 | 26 | 26 | 26 | 26 | 26 | 1 |
| 00001001 | 52 | | 26 | 26 | 26 | 26 | 26 | | 52 | 1 |
| 00001010 | 52 | | 26 | 26 | 26 | 52 | | 26 | 26 | 1 |
| 00001011 | 52 | | 26 | 26 | 26 | 52 | | | 52 | 1 |
| 00001100 | 52 | | 52 | | 26 | 26 | 26 | 26 | 26 | 1 |
| 00001101 | 52 | | 52 | | 26 | 26 | 26 | | 52 | 1 |
| 00001110 | 52 | | 52 | | 26 | 52 | | 26 | 26 | 1 |
| 00001111 | 52 | | 52 | | 26 | 52 | | | 52 | 1 |
| 00010$y_2y_1y_0$ | 52 | | 52 | | — | | 106 | | | 8 |
| 00010$y_2y_1y_0$ | | 106 | | | — | | 52 | | 52 | 8 |
| 00010$y_2y_1y_0$ | 26 | 26 | 26 | 26 | | | 106 | | | 8 |
| 00010$y_2y_1y_0$ | 26 | 26 | | 52 | | 26 | 106 | | | 8 |
| 00010$y_2y_1y_0$ | 52 | | 26 | 26 | 26 | | 106 | | | 8 |
| 00010$y_2y_1y_0$ | 52 | | 52 | | 26 | | 106 | | | 8 |
| 00010$y_2y_1y_0$ | | 106 | | 26 | 26 | 26 | 26 | 26 | | 8 |
| 00010$y_2y_1y_0$ | | 106 | | 26 | 26 | 26 | | | 52 | 8 |
| 00010$y_2y_1y_0$ | | 106 | | 26 | 52 | | 26 | 26 | | 8 |
| 00010$y_2y_1y_0$ | | 106 | | 26 | 52 | | | | 52 | 8 |
| 00010$y_2y_1y_0$ | | 106 | | | — | | 106 | | | 16 |
| 01110000 | 52 | | 52 | | — | | 52 | | 52 | 1 |
| 01110001 | 242-tone RU empty | | | | | | | | | 1 |
| 01110010 | 484-tone RU with zero User fields indicated in this RU Allocation subfield of the HE-SIG-B content channel | | | | | | | | | 1 |
| 01110011 | 996-tone RU with zero User fields indicated in this RU Allocation subfield of the HE-SIG-B content channel | | | | | | | | | 1 |
| 00010$x_1x_0$ | Reserved | | | | | | | | | 4 |
| 00010$y_2y_1y_0$ | Reserved | | | | | | | | | 8 |
| 10$y_2y_1y_0z_2z_1z_0$ | | 106 | | 26 | | | 106 | | | 64 |
| 11000$y_2y_1y_0$ | | | 242 | | | | | | | 8 |
| 11001$y_2y_1y_0$ | | | 484 | | | | | | | 8 |
| 11010$y_2y_1y_0$ | | | 996 | | | | | | | 8 |
| 11011$y_2y_1y_0$ | Reserved | | | | | | | | | 8 |
| 111$x_4x_3x_2x_1x_0$ | Reserved | | | | | | | | | 32 |

If(# Ed) signaling RUs of size greater than 242 subcarriers, $y_2y_1y_0$ = 000-111 indicates number of User fields in the HE-SIG-B content channel that contains the corresponding 8-bit RU Allocation subfield. Otherwise, $y_2y_1y_0$ = 000-111 indicates number of STAs multiplexed in the 106-tone RU, 242-toneRU or the lower frequency 106-tone RU if there are two 106-tone RUs and one 26-tone RU is assigned between two 106-tone RUs. The binary vector $y_2y_1y_0$ indicates $2^2 \times y_2 + 2^1 \times y_1 + y_0 + 1$ STAs multiplexed the RU.
$z_2z_1z_0$ = 000-111 indicates number of STAs multiplexed in the higher frequency 106-tone RU if there are two 106-tone RUs and one 26-tone RU is assigned between two 106-tone RUs. The binary vector $z_2z_1z_0$ indicates $2^2 \times z_2 + 2^1 \times z_1 + z_0 + 1$ STAs multiplexed in the RU.
Similarly, $y_1y_0$ = 00-11 indicates number of STAs multiplexed in the lower frequency 106-tone RU. The binary vector $y_1y_0$ indicates $2^1 \times y_1 + y_0 + 1$ STAs multiplexed in the RU.
Similarly, $z_1z_0$ = 00-11 indicates the number of STAs multiplexed in the higher frequency 106-tone RU. The binary vector $z_1z_0$ indicates $2^1 \times z_1 + z_0 + 1$ STAs multiplexed in the RU.
1 to #9 (from left to the right) is ordered in increasing order of the absolute frequency.
$x_1x_0$ = 00-11, $x_4x_3x_2x_1x_0$ = 00000-11111.
'-' means no STA in that RU.

The user-specific field included in the second control field (HE-SIG-B, 740) may include a user field, a CRC field, and a Tail field. The format of the user-specific field may be defined as follows.

TABLE 10

| Subfield | Number of bits | Description |
|---|---|---|
| User field | N × 21 | The User field format for a non-MU-MIMO allocation is defined in Table 28-26 (User field format for a non-MU-MIMO allocation). The User field format for a MU-MIMO allocation is defined in Table 28-27 (User field for an MU-MIMO allocation). N = 1 if it is the last User Block field, and if there is only one user in the last User Block field. N = 2 otherwise. |
| CRC | 4 | The CRC is calculated over bits 0 to 20 for a User Block field that contains one User field, and bits 0 to 41 for a User Block field that contains two User fields. See 28.3.10.7.3 (CRC computation). |
| Tail | 6 | Used to terminate the trellis of the convolutional decoder. Set to 0. |

Also, the user-specific field of the HE-SIG-B is composed of a plurality of user fields. The plurality of user fields is located after the common field of the HE-SIG-B. The location of the RU allocation subfield of the common field and that of the user field of the user-specific field are used together to identify an RU used for transmitting data of a STA. A plurality of RUs designated as a single STA are now allowed in the user-specific field. Therefore, signaling that allows a STA to decode its own data is transmitted only in one user field.

As an example, it may be assumed that the RU allocation subfield is configured with 8 bits of 01000010 to indicate that five 26-tone RUs are arranged next to one 106-tone RU and three user fields are included in the 106-tone RU. At this time, the 106-tone RU may support multiplexing of the three users. This example may indicate that eight user fields included in the user-specific field are mapped to six RUs, the first three user fields are allocated according to the MU-MIMO scheme in the first 106-tone RU, and the remaining five user fields are allocated to each of the five 26-tone RUs.

User fields included in the user-specific field of the HE-SIG-B may be defined as described below. Firstly, user fields for non-MU-MIMO allocation are as described below.

TABLE 12

| Bit | Subfield | Number of bits | Description |
| --- | --- | --- | --- |
| B0-B10 | STA-ID | 11 | Set to a value of the element indicated from TXVEC-TOR parameter STA_ID_LIST (see 27.11.1(STA_ID_LIST)). |
| B11-B13 | NSTS | 3 | Number of space-time streams. Set to the number of space-time streams minus 1. |
| B14 | Beam-formed (#16038) | 1 | Use of transmit beamforming. Set to 1 if a beamforming steeling matrix is applied to the waveform in an SU transmission. Set to 0 otherwise. |
| B15-B18 | MCS | 4 | Modulation and coding scheme Set to n for MCSn, where n = 0, 1, 2, . . . , 11 Values 12 to 15 are reserved |
| B19 | DCM | 1 | Indicates whether or not DCM is used. Set to 1 to indicate that the payload (#Ed) of the corresponding user of the HE MU PPDU is modulated with DCM for the MCS. Set to 0 to indicate that the pay load of the corresponding user of the PPDU is not modulated with DCM for the MCS. NOTE  DCM is not applied in combination with STBC.(#15664) |
| B20 | Coding | 1 | Indicates whether BCC or LDPC is used. Set to 0 forBCC Set to 1 for LDPC |

NOTE
If the STA-ID subfield is set to 2046, then the other subfields can be set to arbitrary values. (#15946)

User fields for MU-MIMO allocation are as described below.

TABLE 13

| Bit | Subfield | Number of bits | Description |
| --- | --- | --- | --- |
| B0-B10 | STA-ID | 11 | Set to a value of element indicated from TXVEC-TOR parameter STA_ID_LIST (see 27.11.1 (STA_ID_LIST)). |
| B11-B14 | Spatial Configuration | 4 | Indicates the number of spatial streams for a STA in an MU-MIMO allocation (see Table 28-28 (Spatial Configuration subfield encoding)). |
| B15-B18 | MCS | 4 | Modulation and coding scheme. Set to n for MCSn, where n = 0, 1, 2, . . . , 11 Values 12 to 15 are reserved |
| B19 | Reserved | 1 | Reserved and set to 0 |
| B20 | Coding | 1 | Indicates whether BCC or LDPC is used. Set to 0 for BCC Set to 1 for LDPC |

NOTE
If the STA-ID subfield is set to 2046, then the other subfields can be set to arbitrary values.(#15946)

Figure 12:
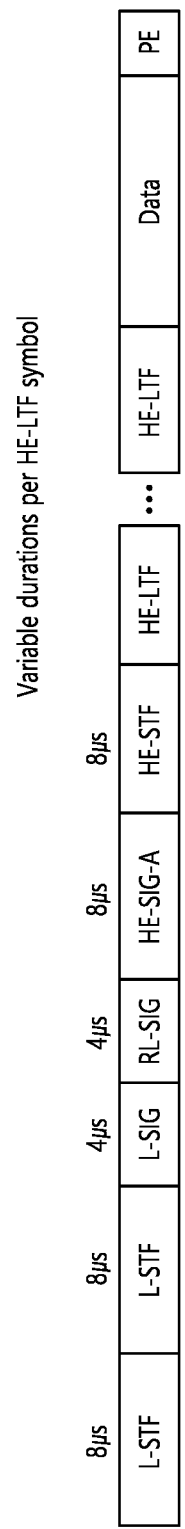
FIG. 12 illustrates one example of an HE TB PPDU.

FIG. 12 illustrates an example of an HE TB PPDU. The PPDU of FIG. 12 illustrates an uplink PPDU transmitted in response to the trigger frame of FIG. 9. At least one STA receiving a trigger frame from an AP may check the common information field and the individual user information field of the trigger frame and may transmit a HE TB PPDU simultaneously with another STA which has received the trigger frame.

As shown in the figure, the PPDU of FIG. 12 includes various fields, each of which corresponds to the field shown in FIGS. 2, 3, and 7. Meanwhile, as shown in the figure, the HE TB PPDU (or uplink PPDU) of FIG. 12 may not include the HE-SIG-B field but only the HE-SIG-A field.

1. CSMA/CA (Carrier Sense Multiple Access/Collision Avoidance)

In IEEE 802.11, communication is achieved in a shared wireless medium, and thus has a characteristic fundamentally different from a wired channel environment. For example, communication is possible based on carrier sense multiple access/collision detection (CSMA/CD) in the wired channel environment For example, when a signal is transmitted one time in Tx, the signal is transmitted to Rx without significant signal attenuation since a channel environment does not change much. In this case, when a collision occurs in two or more signals, it is detectable. This is because power detected in Rx is instantaneously greater than power transmitted in Tx. However, in a wireless channel environment, a channel is affected by various factors (e.g., a signal may be significantly attenuated according to a distance or may instantaneously experience deep fading), carrier sensing cannot be achieved correctly in Tx as to whether a signal is properly transmitted in Rx in practice or whether a collision exists. Therefore, a distributed coordination function (DCF) which is a carrier sense multiple access/collision avoidance (CSMA/CA) mechanism is introduced in 802.11. Herein, stations (STAs) having data to be transmitted perform clear channel assessment (CCA) for sensing a medium during a specific duration (e.g., DIFS: DCF inter-frame space) before transmitting the data. In this case, if the medium is idle, the STA can transmit the data by using the medium. On the other hand, if the medium is busy, under the assumption that several STAs have already waited for the use of the medium, the data can be transmitted after waiting by a random backoff period in addition to the DIFS. In this case, the random backoff period can allow the collision to be avoidable because, under the assumption that there are several STAs for transmitting data, each STA has a different backoff interval probabilistically and thus eventually has a different transmission time. When one STA starts transmission, the other STAs cannot use the medium.

The random backoff time and the procedure will be simply described as follows. When a specific medium transitions from busy to idle, several STAs start a preparation for data transmission. In this case, to minimize a collision, the STAs intending to transmit the data select respective random backoff counts and wait by those slot times. The random backoff count is a pseudo-random integer value, and one of uniform distribution values is selected in the range of [0 CW]. Herein, CW denotes a contention window. A CW parameter takes a CWmin value as an initial value, and when transmission fails, the value is doubled. For example, if an ACK response is not received in response to a transmitted data frame, it may be regarded that a collision occurs. If the CW value has a CWmax value, the CWmax value is maintained until data transmission is successful, and when the data transmission is successful, is reset to the CWmin value. In this case, the values CW, CWmin, and CWmax are preferably maintained to $2^n-1$ for convenience of implementations and operations. Meanwhile, if the random backoff procedure starts, the STA selects the random backoff count in the [0 CW] range and thereafter continuously monitors a medium while counting down a backoff slot. In the meantime, if the medium enters a busy state, the countdown is stopped, and when the medium returns to an idle state, the countdown of the remaining backoff slots is resumed.

The most base of CSMA/CA is carrier sense. A UE uses physical carrier sense and virtual carrier sense in order to determine whether a DCF medium is busy/idle. The Physical carrier sense is performed in a physical layer (PHY) stage, and is performed through energy detection or preamble detection. For example, the UE may determine that the medium is in a busy state if it is determined that a voltage level is measured or a preamble is read in an Rx stage. The Virtual carrier sense prevents other STAs from transmitting data by setting a network allocation vector (NAV), and is performed based on a value of a Duration field of a MAC header.

2. PHY Procedure

A PHY transmit/receive procedure in Wi-Fi is as follows, but a specific packet configuration method may differ. For convenience, only 11n and 11ax will be taken for example, but 11g/ac also conforms to a similar procedure.

That is, in the PHY transmit procedure, a MAC protocol data unit (MPDU) or an aggregate MPDU (A-MPDU) transmitted from a MAC end is converted into a single PHY service data unit (PSDU) in a PHY end, and is transmitted by inserting a preamble, tail bits, and padding bits (optional), and this is called a PPDU.

The PHY receive procedure is usually as follows. When performing energy detection and preamble detection (L/HT/VHT/HE-preamble detection for each WiFi version), information on a PSDU configuration is obtained from a PHY header (L/HT/VHT/HE-SIG) to read a MAC header, and then data is read.

In an extremely high throughput (EHT) TIG of IEEE 802.11, the following scheme is proposed by considering multi-AP coordination as one of the next-generation Wi-Fi characteristics.

3. Improvement of Multi-AP System

A mesh Wi-Fi (Multi-AP solution) is well accepted in the market for a better application range, easier deployment, and higher throughput.

It is preferred to improve performance of Mesh Wi-Fi through joint optimization of the MAC and PHY for the multi-AP system. Hardware of the multi-AP system is already released in the market, and rarely costs unlike in 16 spatial streams.

There is an excellent technology for improving performance of a multi-AP system. The technologies include distributed MIMO, coordination transmission, space/time/frequency sharing and reuse, an effective relay scheme, etc.

Figure 13:
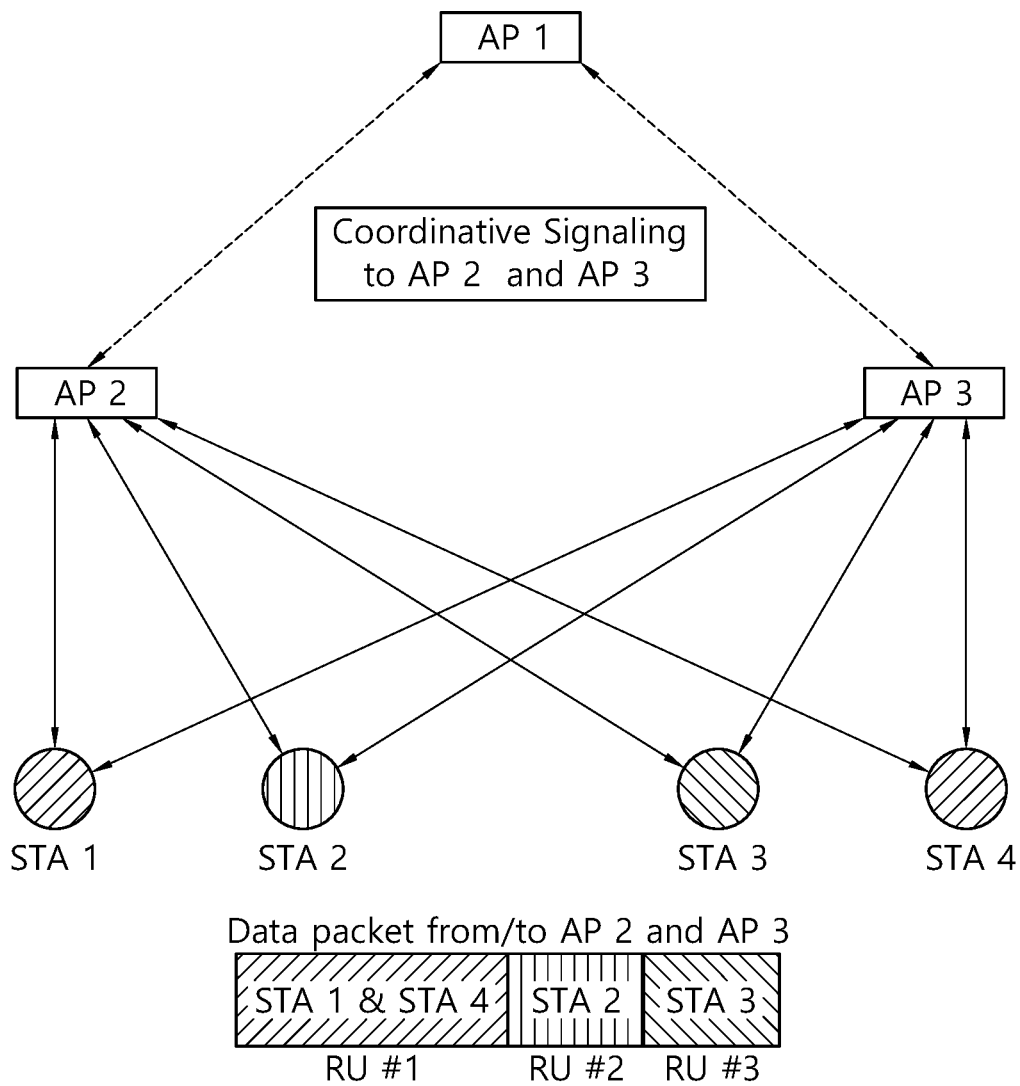
FIG. 13 illustrates an example in which joint multi-AP transmission is activated.

FIG. 13 illustrates an example in which joint multi-AP transmission is activated. Referring to FIG. 13, an AP1 starts joint transmission by sending a coordination signal to an AP2 and an AP3. The AP2 and the AP3 transmit and receive data to and from multiple STAs using OFDMA and MU-MIMO within one data packet. A STA 2 and a STA 3 are placed in different resource units (RUs). Each RU is a frequency segment. A STA 1 and a STA 4 are placed in the same resource unit using MU-MIMO. Respective RUs may be transmitted through multiple spatial streams.

4. Multi-AP Coordination

Figure 14:
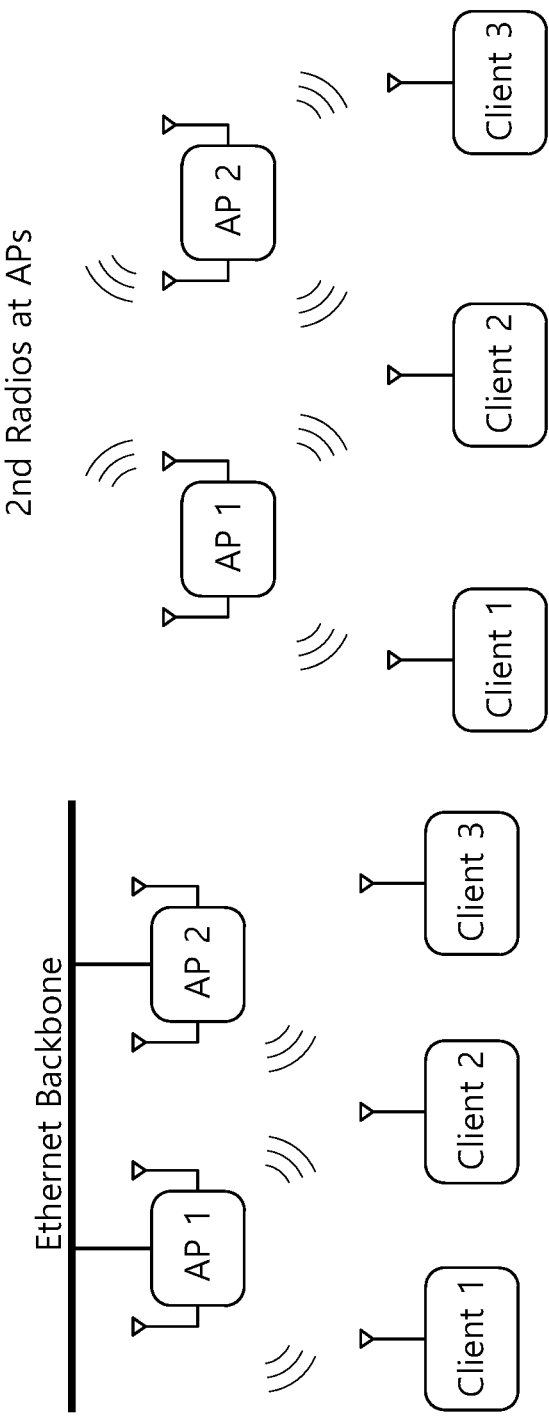
FIG. 14 is a diagram illustrating multi-AP coordination.

FIG. 14 is a diagram illustrating multi-AP coordination.

Multi-AP coordination uses wires (e.g., enterprise) or radio (e.g., a home mesh backbone) for data+clock synchronization.

Furthermore, the multi-AP coordination has an improved link budget and regulation power restriction compared to a single AP having a large antenna array.

The technology of the multi-AP coordination includes null steering for interference avoidance, joint beamforming, and joint MU-MIMO.

Example 1: Null Steering for Interference Avoidance

Figure 15:
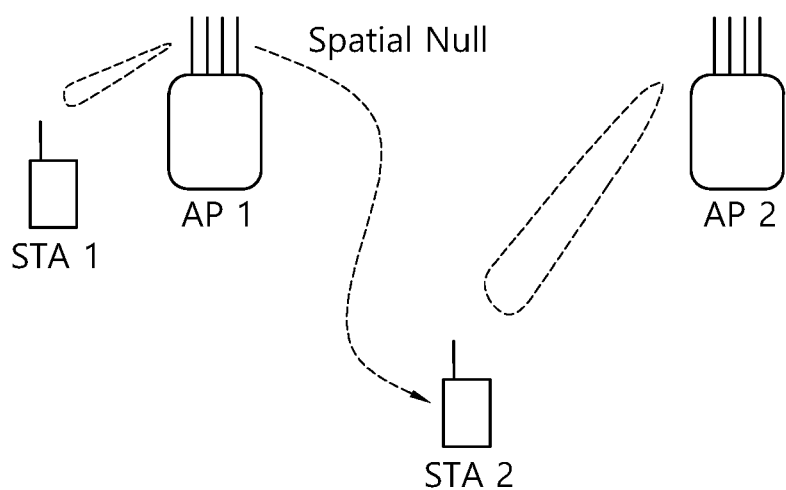
FIG. 15 illustrates an example of a null steering operation for interference avoidance.

FIG. 15 illustrates an example of a null steering operation for interference avoidance. Null steering for interference avoidance is useful when an AP has a large dimension (4×4 or 8×8).

5. The AP Coordination

Figure 16:
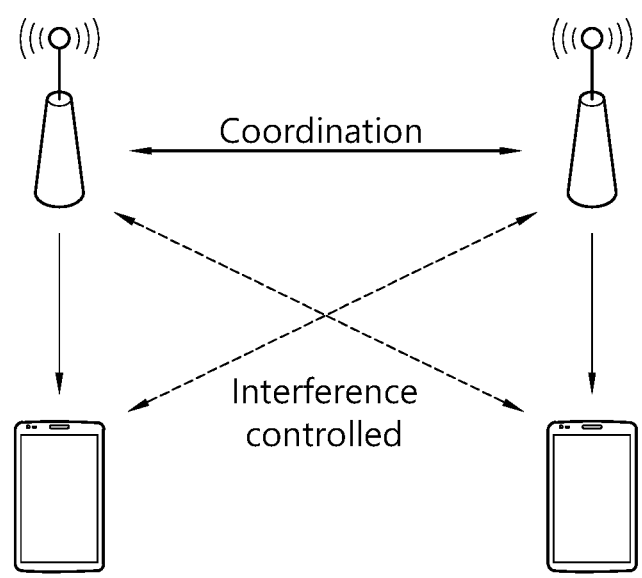
FIG. 16 illustrates an example in which AP coordination and interference are controlled.

FIG. 16 illustrates an example in which AP coordination and interference are controlled.

Coordinated scheduling: coordinated scheduling mitigates/reduces the number of collisions from an AP/STA of another BSS.

Furthermore, coordinated scheduling is a distributed mechanism, and increases the number/probability of parallel transmissions in a more coordinated manner than spatial reuse. There is a need for a message exchange between APs.

Figure 17:
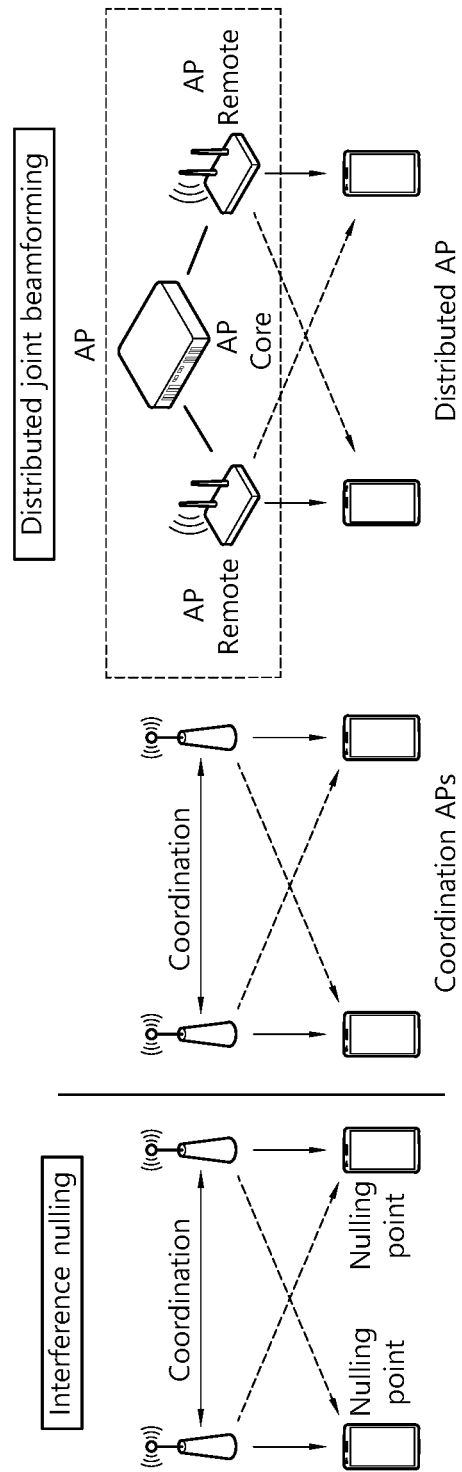
FIG. 17 illustrates interference nulling and distributed joint beamforming.

FIG. 17 illustrates interference nulling and distributed joint beamforming.

Coordinated beamforming: in coordinated beamforming, a nulling point may be designated as another STA, or downlink transmissions may be simultaneously performed without co-channel interference according to beamforming as in distributed joint beamforming.

Furthermore, coordinated beamforming is suitable for a managed deployment (e.g., a company office or a hotel), and has advantages of area throughput and consistent experiences. Furthermore, coordinated beamforming requires coordinated downlink scheduling and improved MU sounding in order to reduce overhead, synchronization, etc.

Figure 18:
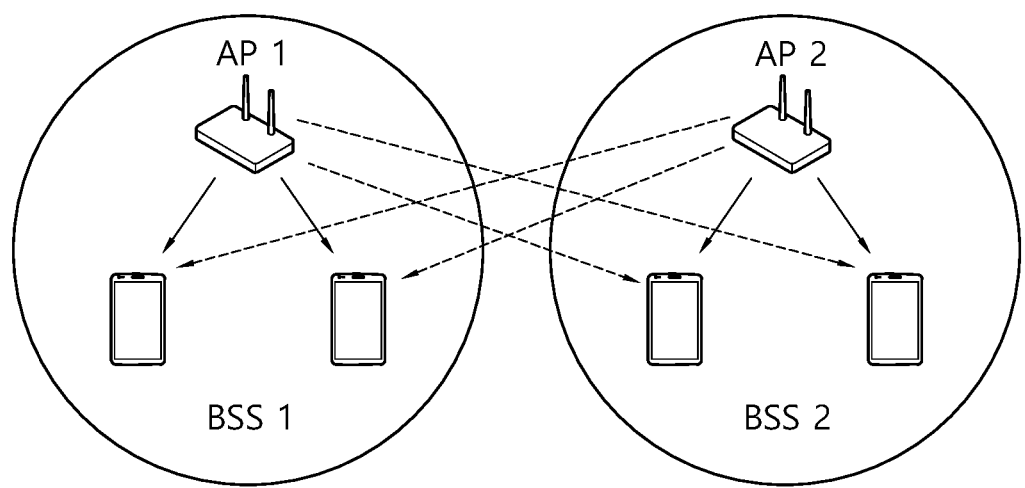
FIG. 18 illustrates an example of coordinated beamforming.

FIG. 18 illustrates an example of coordinated beamforming.

In FIG. 18, a solid line arrow indicates data transmission within a BSS STA. In FIG. 18, a dotted line arrow is null transferred to OBSS STAs. As major properties, a signal for a user is transmitted from only one AP while forming null in an OBSS STA.

Figure 19:
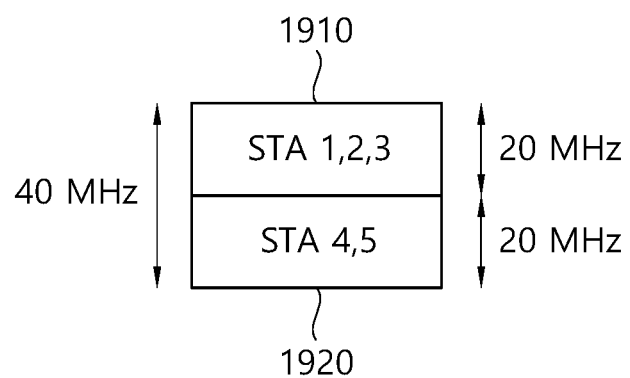
FIG. 19 is a diagram describing C-OFDMA.

FIG. 19 is a diagram describing C-OFDMA.

Coordinated-OFDMA (C-OFDMA) is an extension of 11ax OFDMA from a single BSS to multiple BSS Scenarios. Furthermore, C-OFDMA efficiently uses frequency resources in the entire network. Furthermore, C-OFDMA has improved efficiency when BSS traffic does not fully use resources.

Referring to FIG. 19, a spectrum 1910 used for transmission of a BSS1 and a spectrum 1920 used for the transmission of a BSS2 are present as 20 MHz bands, respectively, in a total of 40 MHz band. In order to obtain orthogonality, synchronized transmission may be performed. STAs 1 to 3 are assigned to the spectrum 1910 used for transmission of the BSS1, and STAs 4 and 5 are assigned to the spectrum 1920 used for the transmission of the BSS2.

Figure 20:
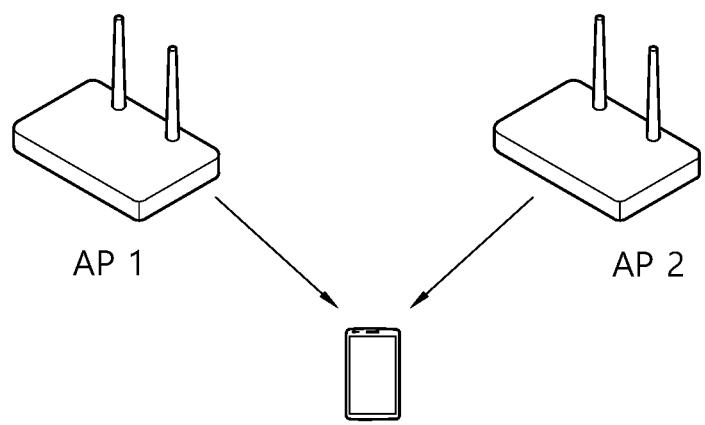
FIG. 20 illustrates an example of joint transmission.

FIG. 20 illustrates an example of joint transmission.

Joint transmission means that joint beamforming is performed on a single STA (J-Tx). Referring to FIG. 20, one STA is provided with service by an AP1 and an AP2.

Joint transmission may have more strict synchronization requirements, and thus needs to be checked separately. Joint transmission may be more easily performed compared to joint processing transmission for multiple STAs. In this case, the joint transmission abuses beamforming and a power gain from multiple APs.

6. Proposed Embodiment: Procedure for Multi-AP Coordination in a Higher Layer In a Wi-Fi system, a multi-AP coordination technology is a method of minimizing interference between BSSs upon data transmission and reception by allowing APs to share channel feedback information and scheduling information of a UE or increasing data transmission efficiency by allowing two or more APs to participate in data transmission and reception for a UE at specific timing, upon data frame transmission and reception between the UE and the AP. In the Wi-Fi system, such a multi-AP coordination technology has not yet been standardized, but recently in IEEE802.11 EHT TIG, standardization related to multi-AP coordination is newly discussed as a next WiFi technology. In this patent, a standard technology for multi-AP coordination and a level according to a scenario are defined in a Wi-Fi system. Functions necessary for them are proposed from a high level viewpoint.

Hereinafter, levels classified based on the number of AP associations and the number of AP coordination transmissions are described.

Level 1: supports an associated STA with one AP and coordinated transmission and reception with an associated AP.

Required function

1) Multi-AP sounding procedure (e.g., sounding feedback, channel information for adjacent AP measured results are shared)

2) Coordinated beamforming/scheduling, interference nulling/avoidance between multiple APs belonging to a multi-AP coordination group Level 2: STA associated with one or more APs (one primary associated AP (P-AP) and one or more secondary associated APs (S-APs) are defined), supports coordinated transmission and reception with one AP at a specific time.

Required function

1) Dynamic AP selection: for data transmission and reception with a specific STA, an AP of a multi-AP coordination group may be dynamically selected based on an explicit measurement report (e.g., a sounding feedback report or a CSI feedback report using a control frame) or an implicit method, such as an UL signal measured by APs belonging to a multi-AP coordination group.

2) A P-AP and an S-AP function: the P-AP may be defined as an AP with which a STA is directly associated. The S-AP is virtually associated with a STA through a P-AP. The P-AP may provide a STA with information (e.g., the BSSID of an S-AP or an AID used in an S-AP) of an S-AP.

3) Feedback mechanism for the best AP selection, STA context, and data sharing in a multi-AP (with respect to a specific UE)

Level 3: STA associated with one or more APs (one primary associated AP (P-AP) and one or more secondary associated APs (S-APs) are defined), support coordinated transmission and reception with one or more APs in a specific time.

Joint Tx/Rx for the same data

Joint Tx/Rx for other data

Multi-AP sounding, context sharing, sync in a multi-AP, sharing of data and control information in a multi-A Furthermore, levels classified based on resource utilization and transmission timing may be described as follows.

In the case of Level 3, an AP1 and an AP2 may transmit and receive data frames to/from a non-AP STA using levels classified based on resource utilization and transmission timing as follows.

Level 3-1: the same frequency resource (e.g., the same frequency band, but a different RU or the same frequency band and the same RU) and simultaneous transmission and reception. In this case, the coupling of multi-user MIMO or a single frequency network (SFN) may be used for coordinated transmission and reception.

Level 3-2: different frequency resources (e.g., different frequency bands or the same frequency band, but different RUs), and simultaneous transmission and reception Level 3-3: the same frequency resource (e.g., the same frequency band, but different RUs or the same frequency band and the same RU) within the same TXOP, and transmission and reception at different times Level 3-4: transmission and reception using different frequency resources (e.g., different frequency bands or the same frequency band, but different RUs) at different times within the same TXOP Multi-AP coordination transmission may be performed using different TXOPs, but the complexity of a receiver may be increased due to data frame buffering. Accordingly, it is preferred that multi-AP coordination transmission is performed within the same TXOP.

The classified levels are divided into technology categories as follows.

TABLE 14

| Tech. Cat. | Time | AP1 Tx | AP2 Tx | Gain |
|---|---|---|---|---|
| C-BF/C-SCD | T1 | RU1 (STA1) | RU2 (STA2) | IF nulling, Freq. re-use |
| D-AP selection | T1 T2 | RU (STA1) | RU (STA1) | No combining gain, best link selection |
| JTX (D-MIMO) | T1 | RU1 (STA1) | RU1 (STA1) | Spatial diversity, SNR gain |
| JTX with time diversity | T1 T2 | RU (STA1) | RU (STA1) | Time diversity, combining gain |

Multi-AP coordination transmission is described below for each scenario.

<Scenario 1>

Figure 21:
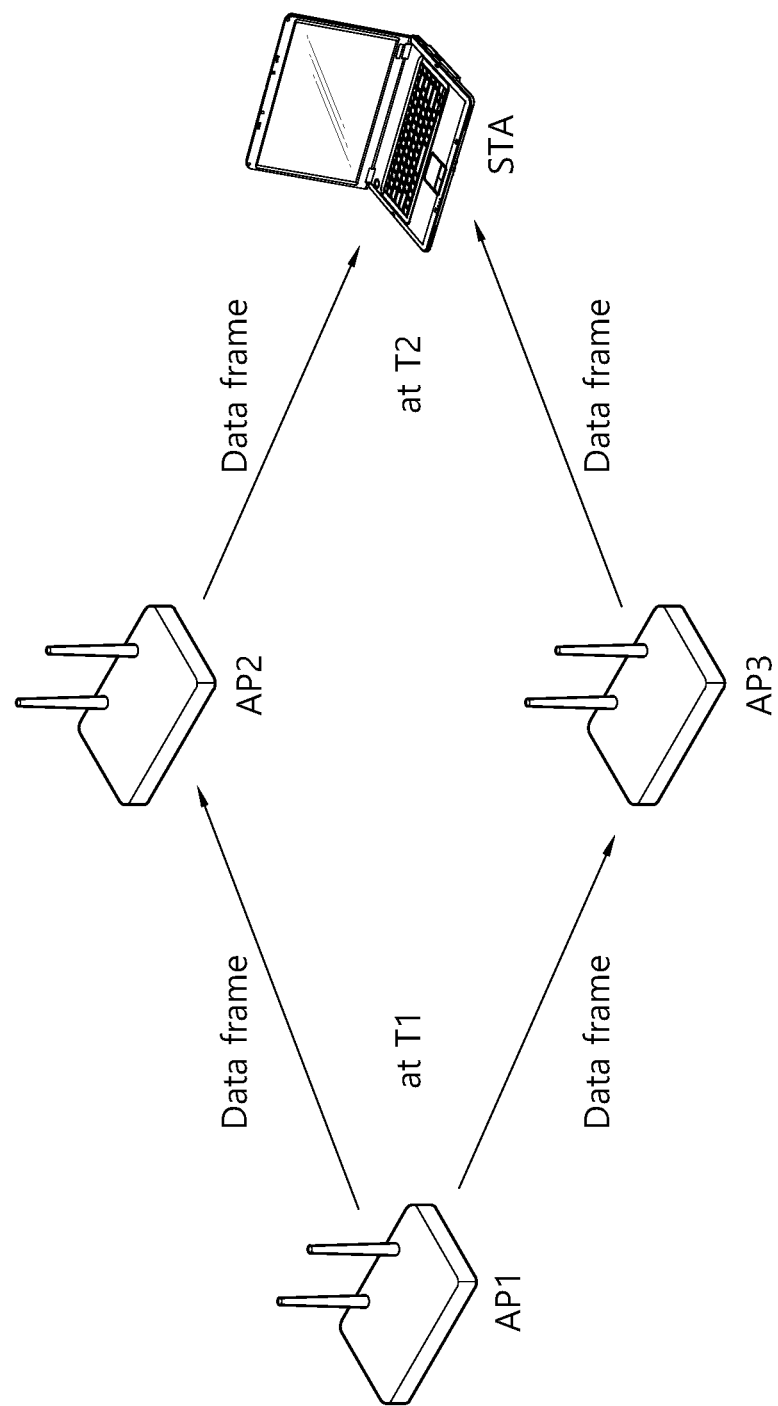
FIG. 21 illustrates an example in which joint transmission according to Scenario 1 is performed.

FIG. 21 illustrates an example in which joint transmission according to Scenario 1 is performed.

A master AP (M-AP) acts as an AP coordinator. A slave AP (S-AP) may participate in joint transmission coordinated by an M-AP, and may have all the functions of a STA and an AP. Referring to FIG. 21, an S-AP1 and an S-AP2 have the function of a STA in a coordination step, and have the function of an AP in a joint transmission step.

Referring to FIG. 21, at T1, an AP1 transmits a data frame to an AP2 and an AP3. The AP2 and the AP3 transmit a data frame to a STA at T2. The STA receives the data frames from the AP2 and the AP3 (i.e., the STA may obtain a coupling (or diversity) gain with the data frames received from the AP2 and the AP3).

In this case, the STA may receive a data frame from an AP (AP2 or AP3) simultaneously coordinated with Level 3-1 or 3-2.

In the case of DL (the AP2 and the AP3 transmit the data frames to the STA), timing information and frequency resource (i.e., BW and/or resource unit) information for the data frame transmission need to be shared between the AP1 and the AP2/AP3 participating in the data frame transmission.

Furthermore, an MU RTS trigger frame (transmission from the AP1)/CTS frame (transmission from the AP2 and the AP3), a CTS-to-self frame (transmission from the AP1), or another control frame may be transmitted in order to obtain a TXOP for the data frame transmission during T1 and T2. In this case, a modified MU RTS trigger frame or a modified CTS-to-self frame and another control frame may be defined to indicate that the TXOP will be used for the multi-AP coordination transmission.

A backward protocol may be used so that an AP permits frame transmission in the AP2 and the AP3. In this case, a CAS control field may include a reverse direction grant (RDG) subfield and subfield for coordinated transmission indication for the STA.

A PPDU transmitted to the AP2 and the AP3 may include information on coordinated transmission in a PHY header, such as the indication of coordinated transmission, a recipient address (i.e., the identifications of the AP2 and the AP3 or the identification of a coordination group), and the final destination address (e.g., the AID of the STA).

<Scenario 2>

Figure 22:
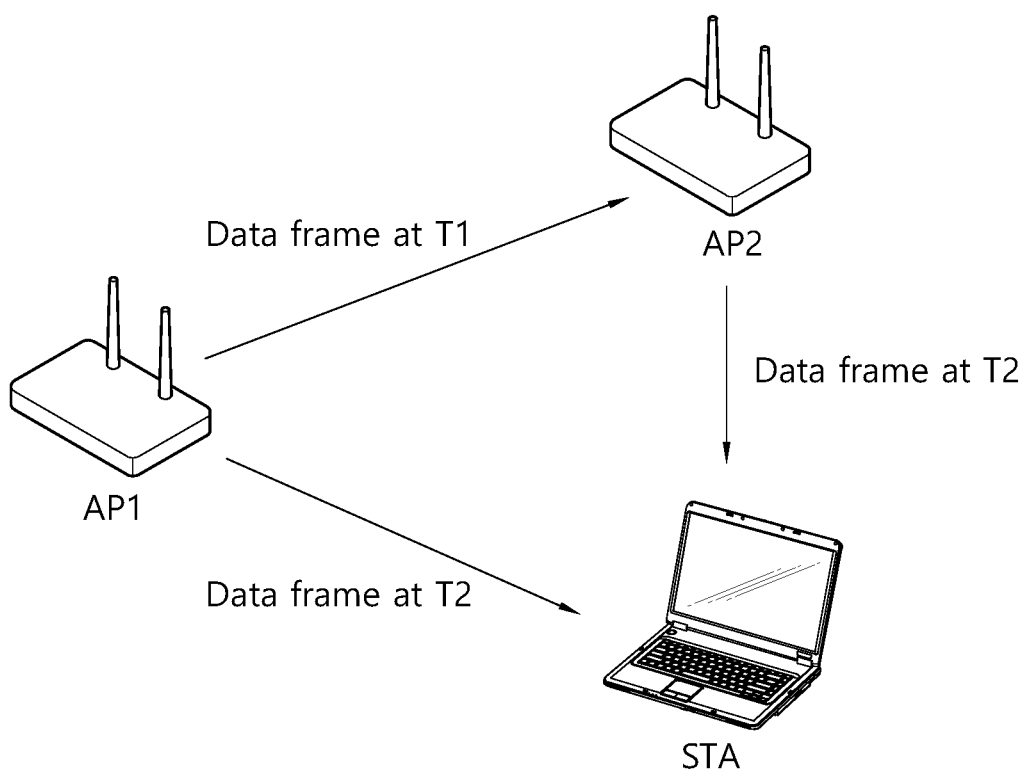
FIG. 22 illustrates an example in which joint transmission according to Scenario 2 is performed.

FIG. 22 illustrates an example in which joint transmission according to Scenario 2 is performed.

Referring to FIG. 22, at T1, an AP1 transmits a data frame to an AP2 and a STA. At T2, the AP2 transmits a data frame to the STA. The STA receives the data frame from the AP at T1, and receives the data frame from the AP2 at T2 (i.e., the STA may obtain a coupling (or diversity) gain with the data frames received from the AP1 and the AP2).

In this scenario, the STA needs to couple the data frame transmitted by the AP1 and the AP2 at different times. To this end, a PPDU including such a data frame may be defined as a format different from a common PPDU. However, an SNR gain as in Scenario 1 is not provided, and only a time diversity gain may be provided.

In this case the STA cannot receive a data frame an AP (AP1 or AP2) simultaneously coordinated with Level 3-3 or 3-4.

In the case of DL (the AP1 and the AP2 transmit the data frames to the STA), an RTS frame (transmission from the AP1)/CTS frame (transmission from the AP2), a CTS-to-self frame (transmission from the AP1), or another control frame is transmitted in order to obtain a TXOP for coordinated transmission during T1 and T2. In this case, a modified RTS frame, a modified CTS-to-self frame, or another control frame may be defined to indicate that the TXOP will be used for multi-AP coordinated transmission.

In this case, the AP1 may be a TXOP holder. The AP2 may transmit the frame within the same TXOP (obtained by the AP1) right after receiving the data frame from the AP1 as a response to the data frame received from the AP1 or right after transmitting an Ack/BA frame to the AP1.

The AP1 may use a backward protocol to permit frame transmission from the AP2. In this case, a CAS control field may include a reverse direction grant (RDG) subfield and a subfield for the indication of coordinated transmission to the STA.

The PPDU transmitted to the STA and the AP2 may include information on coordinated transmission in a PHY header (i.e., SIG field), such as the indication of coordinated transmission, a recipient address (i.e., the identification of the AP2 or the identification of a coordination group), and the final destination address (e.g., the AID of the STA).

EHT needs to extend its multi-AP transmission support for the improvement of efficiency, an increase in a maximum throughput, and a reduction in a waiting time. A potential plan for supporting EHT is described below.

Level 1: spatial or scheduling coordination for multi-AP transmission

Level 2: dynamic AP selection

Level 3: joint transmission with multiple APs

In Level 3, in order for multiple APs to transmit a frame using joint transmission through multi-AP coordination, the following process needs to be defined.

STEP1: APs participating in multi-AP transmission previously share a data frame (may include a control or management frame) to be transmitted to a STA.

STEP2: Upon multi-AP transmission, all of the APs perform joint transmission for the previously shared data frame on the STA using the same frequency resource at the same timing.

In STEP1, in order to previously share the data frame between the APs for joint transmission, a wireless medium or a wired medium may be used. This specification proposes a method if a wireless medium is used.

Embodiment 1

For example, as shown in FIG. 21, the AP1 transmits the data frame for joint transmission to the AP2 and the AP3 at the T1 timing. In this case, a group ID or broadcast ID may be used so that the SIG-B address of a PPDU can be received by the AP2 and the AP3.

Figure 23:
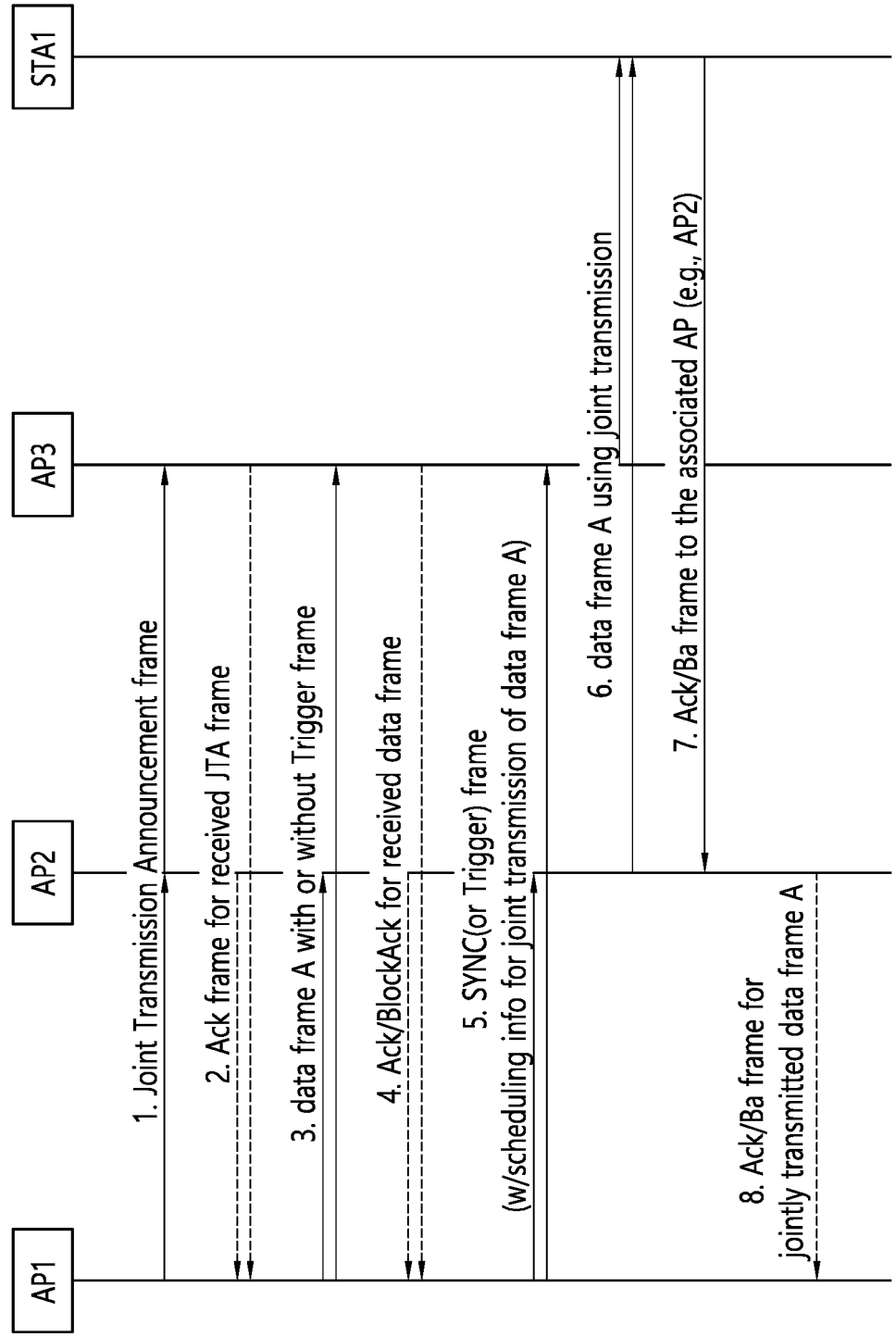
FIG. 23 illustrates a detailed procedure of the joint transmission of FIG. 21.

Furthermore, separately from this, resource assignment information may be notified so that BlockAck can be transmitted using an UL OFDMA RU with respect to the data frame received by the AP2 and the AP3 by including a trigger frame in an A-MPDU. In this case, a Group address (or multicast address) or a Broadcast address instead of a unicast address may be included in the Receiver Address field of the trigger frame as in the example so that the AP2 and the AP3 can receive/process the corresponding trigger frame. Address information (AID assigned to the AP2 and the AP3 by the AP1, etc.) of each of the AP2 and the AP3 and RU information may be included in the Userinfo field of the trigger frame for the AP2 and the AP3. In the existing 11ax, trigger information for Ack/BA frame transmission for a data frame is different from transmission through a unicast data frame and an A-MPDU in the form of a unicast trigger frame. FIG. 23 illustrates an example in which an AP2 and an AP3 transmit a data frame to a STA through joint transmission through the coordination of an AP1.

FIG. 23 illustrates a detailed procedure of the joint transmission of FIG. 21.

In this specification, the AP1 that coordinates joint transmission may be called a joint transmission controller, an AP coordinator, an AP controller, a joint transmission TXOP holder, etc.

FIG. 23 illustrates a procedure of Step1 to Step8. Each of the steps is described as follows.

Step1: the AP1 may transmit a control frame (e.g., Joint Transmission Announcement frame) for initiating joint transmission to the AP2 and the AP3 that will participate in the joint transmission. The control frame may include the identifications of the AP3 and the AP2 participating in the joint transmission (the AID of the AP2 and the AP3 or the MAC address of the AP2 and the AP3 assigned thereto when associated with the AP1) and a separate identification used for the joint transmission. The separate identification may be an ID used upon joint transmission. For example, assuming that an ID of the AP2 and the AP3 used upon joint transmission to the STA1 is A, an ID of the AP2 and the AP3 used upon joint transmission to another STA2 may be assigned B, and an ID of an AP 4 and an AP5, that is, other APs, used upon joint transmission to another STA3 may be assigned C. Joint transmission identifications (JTIDs), such as A, B, and C, may be included in a control frame (in FIG. 23, a SYNC or Trigger frame in Step5) that triggers actual joint transmission, and may include (or indicate) information (some of or the entire information) indicating to which STA which AP will transmit which data.

Step2: the AP2 and the AP3 that have received the control frame for initiating the joint transmission from the AP1 may transmit an Ack frame for the corresponding control frame reception to the AP1. In this case, the corresponding procedure may be selectively omitted.

Step3: a data frame (may include a control or management frame) to be transmitted to the STA is transmitted to the AP2 and the AP3 after Step1 or Step2 through the joint transmission. In this case, as in Step4, if an immediate acknowledgement frame for the transmission data frame needs to be received, a control frame, such as a trigger frame, may be selectively included along with the data frame. Accordingly, the AP2 and the AP3 may provide notification an uplink multi-user resource assignment and transmission parameter information on which the acknowledgement frame may be transmitted.

Step4: the AP2 and the AP3 that have received the data frame to be joint-transmitted from the AP1 transmit Ack or a Block Ack frame for the corresponding data frame. In this case, the corresponding procedure may be selectively omitted.

Step5: after Step3 or Step4, the AP1 transmits a control frame (named a SYNC frame or a Trigger frame in this specification) including scheduling information (a BW, a resource unit, an MCS, MIMO information, Tx Power, etc. necessary for data frame transmission) necessary for the joint transmission of the AP2 and the AP3.

Step6: the AP2 and the AP3 that have received the control frame for the joint transmission through Step5 transmit, to the STA1, the data frame previously received in the Step3 process through the joint transmission using the information included in the corresponding control frame.

Step7: the STA1 that has received the data frame from the AP2 and the AP3 through the joint transmission transmits an acknowledgement frame (e.g., Ack or Block-Ack frame) to an associated AP (in the present embodiment, the AP2).

Step8: the AP2 that has received the acknowledgement frame from the STA1 transmits the corresponding acknowledgement information to the AP1. In this case, the corresponding procedure may be selectively omitted.

When information on an MPDU not successfully received by the UE through the Step7 and Step8 processes is shared between the APs, packets whose reception has failed may be re-transmitted through joint transmission by repeating the processes from Step1 to Step8 during separate TXOP.

Embodiment 2

Another embodiment is an example in which as shown in FIG. 22, an AP1 shares a data frame for joint transmission with an AP2 at T1 timing and then the AP1 and the AP2 transmit the data frame to a STA through joint transmission at T2 timing.

Figure 24:
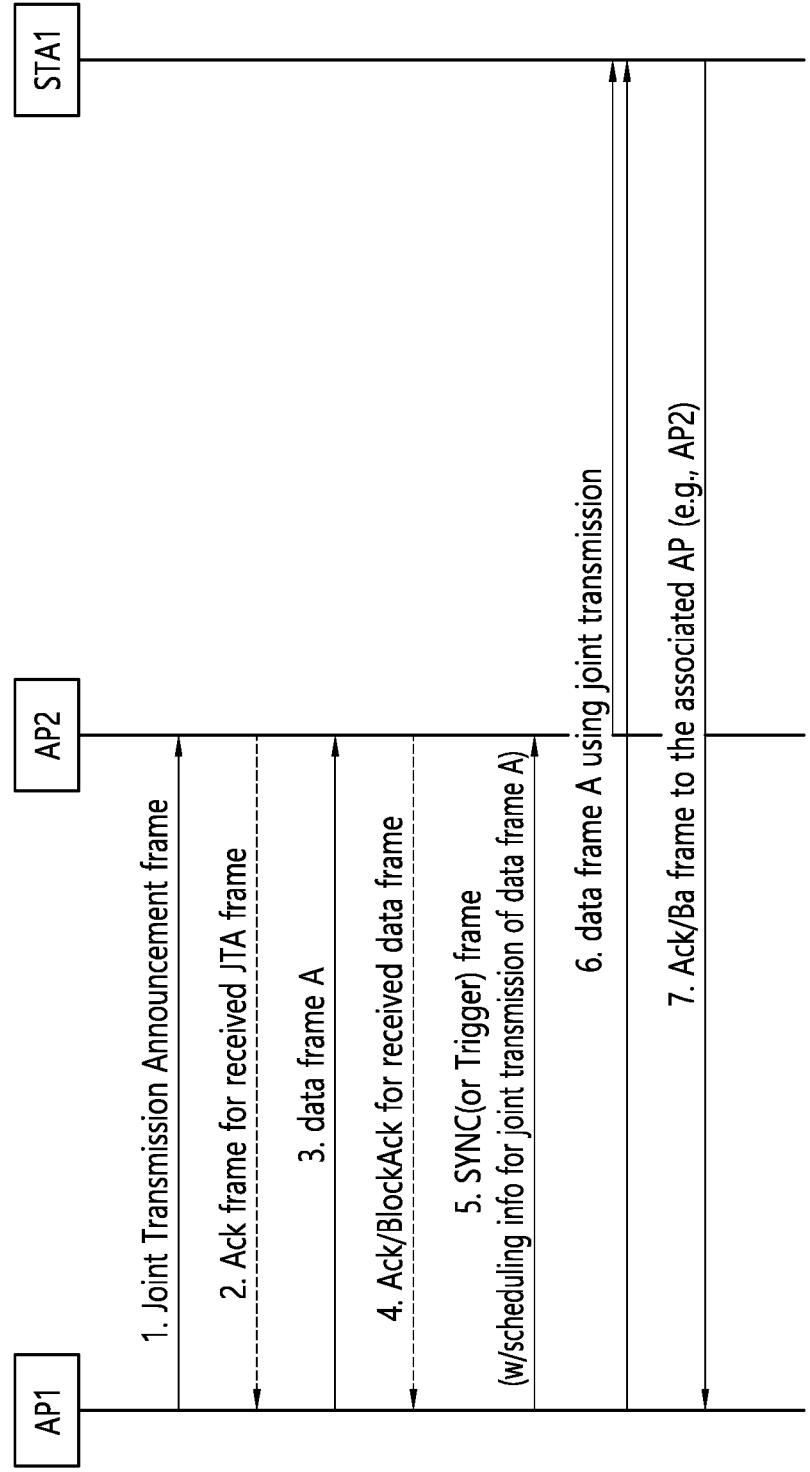
FIG. 24 illustrates a detailed procedure of the joint transmission of FIG. 22.

FIG. 24 illustrates a detailed procedure of the joint transmission of FIG. 22.

FIG. 24 illustrates a procedure of Step1 to Step7. Each of the steps is described as follows.

Step1: the AP1 may transmit a control frame (e.g., Joint Transmission Announcement frame) for initiating joint transmission to the AP2 that will participate in the joint transmission along with the AP1. The control frame may include the identification of the AP2 (the AID of the AP2 or the MAC Address of the AP2 assigned thereto when associated with the AP1) that participates in the joint transmission and a separate identification used for the joint transmission. The separate identification may be an ID used upon joint transmission. For example, assuming that an ID of the AP2 used upon joint transmission to the STA1 is A, an ID the AP2 used upon joint transmission to another STA2 may be assigned B, and an ID of an AP3, that is, another AP, used upon joint transmission to another STA3, may be assigned C. Such a joint transmission identification (JTID) may be included in a control frame (in FIG. 24, a SYNC or Trigger frame in Step5) that triggers actual joint transmission, and may include (or indicate) information (some or all of them) indicating to which STA which AP will transmit which data.

Step2: the AP2 that has received the control frame for initiating the joint transmission from the AP1 may transmit an Ack frame for the corresponding control frame reception to the AP1. In this case, the corresponding procedure may be selectively omitted.

Step3: the data frame (may include a control or management frame) to be transmitted to the STA may be transmitted to the AP2 after Step1 or Step2 through the joint transmission.

Step4: the AP2 that has received the data frame to be joint-transmitted from the AP1 transmits an acknowledgement frame (Ack or BlockAck frame) for the corresponding data frame. In this case, the corresponding procedure may be selectively omitted.

Step5: after Step3 or Step4, the AP2 transmits a control frame (named a SYNC frame or Trigger frame in this specification) including scheduling information necessary for the joint transmission (a BW, a resource unit, an MCS, MIMO information, Tx Power, etc. necessary for the data frame transmission).

Step6: the AP2 that has received the control frame for the joint transmission through Step5 transmits, to the STA1, the data frame previously received in the Step3 process through the joint transmission using the control information included in the corresponding control frame. At this time, the AP1 transmits the data frame to the STA1 along with the AP2 through the joint transmission.

Step7: the STA1 that has received the data frame from the AP1 and the AP2 through the joint transmission transmits an acknowledgement frame (e.g., Ack or Block-Ack frame) to an associated AP (in the present embodiment, the AP1). If the AP2 is an associated AP of the STA, the STA1 transmits acknowledgement to the AP2. In Step8 in FIG. 23 of the embodiment 1, the AP2 that has received the acknowledgement may transmit corresponding acknowledgement information to the AP1. This specification illustrates that a STA transmits a corresponding acknowledgement frame to an associated AP after receiving a joint-transmitted data frame. However, an associated AP may be defined as a separate AP (e.g., may be named a primary AP, a master AP or the like) therefor, and such separate AP information may be previously shared between the APs and the UE.

When information on an MPDU not successfully received by the UE through the Step7 process is transmitted to the AP, packets whose reception has failed may be re-transmitted through joint transmission by repeating the processes from Step1 to Step7 during a separate TXOP.

Figure 25:
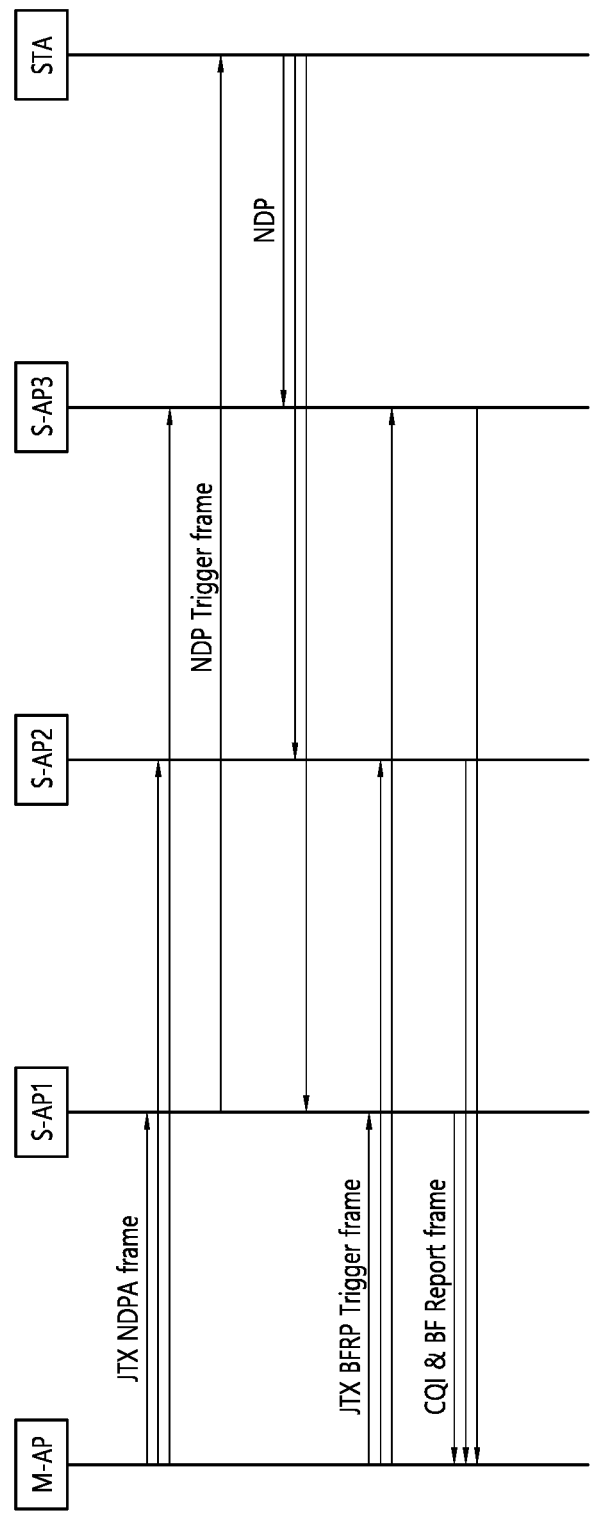
FIG. 25 illustrates a sounding procedure for the selection and joint transmission of an AP.

FIG. 25 illustrates a sounding procedure for the selection and joint transmission of an AP.

Referring to FIG. 25, an M-AP transmits a joint transmission null data packet announcement (JTX NDPA) frame to S-APs. Furthermore, the M-AP notifies the S-APs that joint transmission needs to be performed in a STA 1 and the S-APs need to request an AP1 associated with a STA 1 in order to transmit a trigger frame that requests (solicits) the NDP of the STA. Furthermore, the M-AP may select an S-AP that will participate in M-AP joint transmission by requesting the S-APs to feed channel state information back after receiving the NDP from the STA 1.

The S-AP1 transmits a trigger frame that requests the NDP of the STA (in this case, this procedure may be omitted if the STA can directly receive the JTX NDPA frame from the M-AP).

The STA transmits an NDP frame.

The S-APs measure a channel state and feed the measured channel state back to the M-AP. An UL MU procedure may be used to transmit feedback from multiple S-APs. Channel reciprocity may be used to calculate a precoding matrix in joint transmission.

The M-AP selects an S-AP and shares channel state information/data.

Thereafter, JTX is performed, which may be described as follows.

FIG. 26 illustrates a procedure of joint transmission from a multi-AP.

Joint transmission from a multi-AP needs to be controlled and initiated by an M-AP. The M-AP may be a TXOP holder for joint transmission.

An NDP sounding procedure and a procedure similar to the existing mechanism, such as an RD protocol, may be defined.

Referring to FIG. 26, joint transmission announcement (JTA, similar to NDPA) transmitted by an M-AP may be the first frame of a TXOP for joint transmission. JTA may identify S-APs participating in joint transmission.

A data frame (similar to an NDP) transmitted by the M-AP may include data for joint transmission shared between the S-APs.

A joint transmission (JT) trigger frame (similar to beam-forming report poll (BFRP)) trigger) transmitted by the M-AP may include scheduling for joint transmission and other control information. Furthermore, synchronization in the S-AP for the joint transmission may be performed based on the JT trigger frame.

Joint transmission (similar to an RD protocol) by the S-APs (and the M-AP) may be joint transmission through which a data frame is transmitted to a non-AP STA(s) by multiple APs.

A method of activating joint transmission is as follows.
Joint transmission includes capabilities that enable characteristics, such as an NDP feedback report of 11ax, a punctured preamble, and ER SU PPDU.
Furthermore, joint transmission may use an operation mode, such as OM control field indication for an Rx/TX operation mode parameter change.
Furthermore, joint transmission is used to activate multi-AP JTX.

A method of sharing data for the joint transmission of APs is as follows.
An M-AP generates and shares joint-transmitted MPDUs. It is necessary to define a rule for configuring a field by inputting a dynamic value in an MPDU.
An M-AP shares an MDSU along with context (e.g., security key) of a STA. An S-AP generates an MPDU joint-transmitted with the same content.

A method of accessing a channel for the joint transmission of APs is as follows.
Channel access is triggered by an M-AP, and channel sensing is not considered by an S-AP.
If virtual carrier sensing is considered and joint transmission is triggered, the S-AP may consider a non-zero NAV value except an NAV configured by a frame received from the M-AP or may consider any S-AP belonging to the same group for joint transmission.

Hereinafter, the aforementioned embodiment is described with reference to FIGS. 13 to 26.

Figure 27:
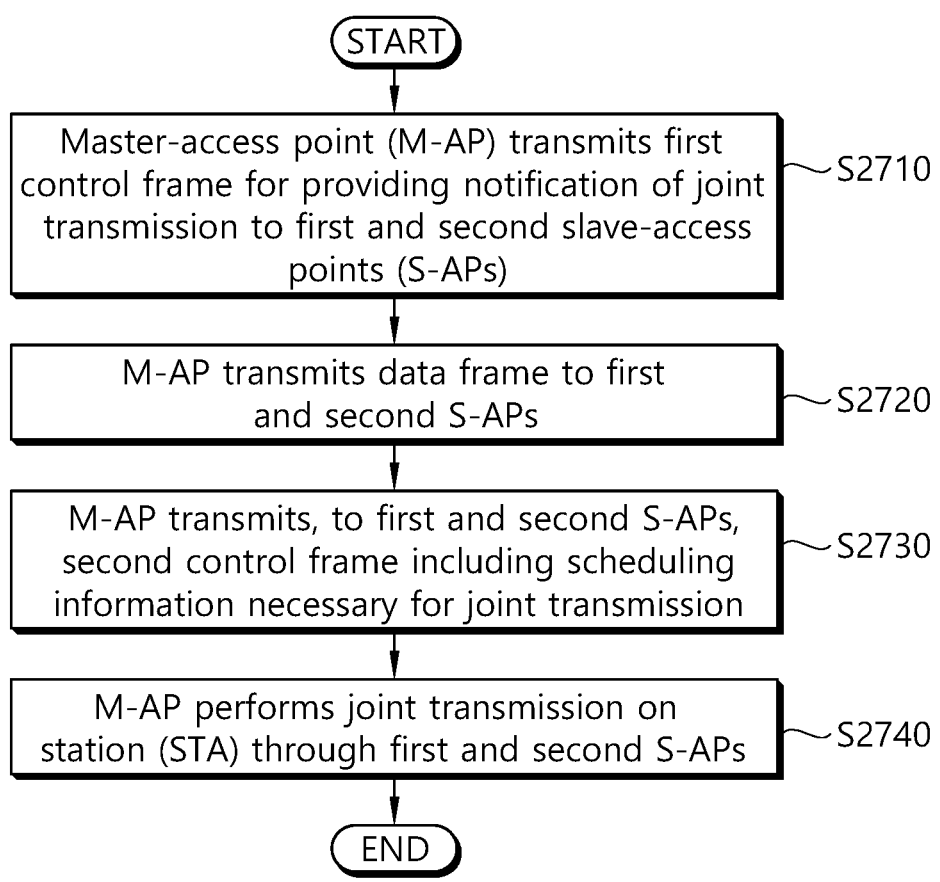
FIG. 27 is a flowchart illustrating a procedure of transmitting, by an AP, a joint frame according to the present embodiment.

FIG. 27 is a flowchart illustrating a procedure of transmitting, by an AP, a joint frame according to the present embodiment.

An example of FIG. 27 may be performed in a network environment in which a next-generation WLAN system is supported. The next-generation WLAN system is an improved WLAN system of the 802.11ax system, and may satisfy backward compatibility with the 802.11ax system.

The example of FIG. 27 is performed in a master-AP (M-AP) supporting a multi-AP. A reception apparatus of FIG. 25 may correspond to a STA supporting an extremely high throughput (EHT) WLAN system.

In step S2710, a master-access point (M-AP) transmits a first control frame for providing notification of the joint transmission to first and second slave-access points (S-APs).

In step S2720, the M-AP transmits a data frame to the first and second S-APs. In this case, the data frame is a data frame to be transmitted to a STA through the joint transmission.

In step S2730, the M-AP transmits, to the first and second S-APs, a second control frame including scheduling information necessary for the joint transmission.

In step S2740, the M-AP performs the joint transmission on the station (STA) through the first and second S-APs.

The M-AP acts as a coordinator that coordinates a multi-AP (wherein the first S-AP and the second S-AP).

The first control frame may be a joint transmission announcement (JTA) frame. That is, the first control frame may be said to include control information for initiating the joint transmission for the first and second S-APs.

The first control frame may include a first identification and a second identification. The first identification may be an association identifier (AID) or MAC address of the first and second S-APs participating in the joint transmission. The second identification may be a temporary identifier of the first and second S-APs and the STA participating in the joint transmission.

The second control frame may be a synchronization frame or a joint transmission trigger frame.

The second control frame may include information on a bandwidth for the scheduling of the data frame, a resource unit, a modulation and coding scheme (MCS), multi-input multi-output (MIMO), and transmission power.

The synchronization of the first and second S-APs for the joint transmission may be performed based on the synchronization frame.

Furthermore, the M-A may receive a first ACK frame from the first and second S-APs as a response to the first control frame. Furthermore, the M-A may receive a second ACK frame from the first and second S-APs as a response to the data frame. In this case, a procedure of receiving the first and second ACK frames may be selectively omitted.

A third ACK frame, that is, a response to the data frame transmitted through the joint transmission, may be transmitted from the STA to the first S-AP. In this case, the first S-AP is associated with the STA. Accordingly, the STA may transmit the third ACK to only the first S-AP.

The M-AP may receive, from the first S-AP, a fourth ACK frame including the same ACK information as the third ACK frame. Whether the STA has successfully received the data frame through the joint transmission through the procedure of receiving the third and fourth ACK frames may be shared between the APs. In this case, the procedure of receiving the third and fourth ACK frames may be selectively omitted.

All of the aforementioned procedures are performed within one TXOP. If the STA has failed in the reception of the data frame, the STA may perform the joint transmission again by repeating the aforementioned procedures during another TXOP.

The M-AP may select an S-AP that will participate in the joint transmission based on channel state information.

The channel state information may be measured by the STA and included in an NDP frame. The null data packet (NDP) frame may be transmitted from the STA to the first S-AP based on an NDP trigger frame. Likewise, the first S-AP is associated with the STA. The NDP trigger frame may be transmitted from the first S-AP to the STA based on the first control frame. The aforementioned procedures are descriptions of a sounding procedure based on the NDP frame.

The M-AP and the first and second S-APs may be connected through wireless backhaul.

Figure 28:
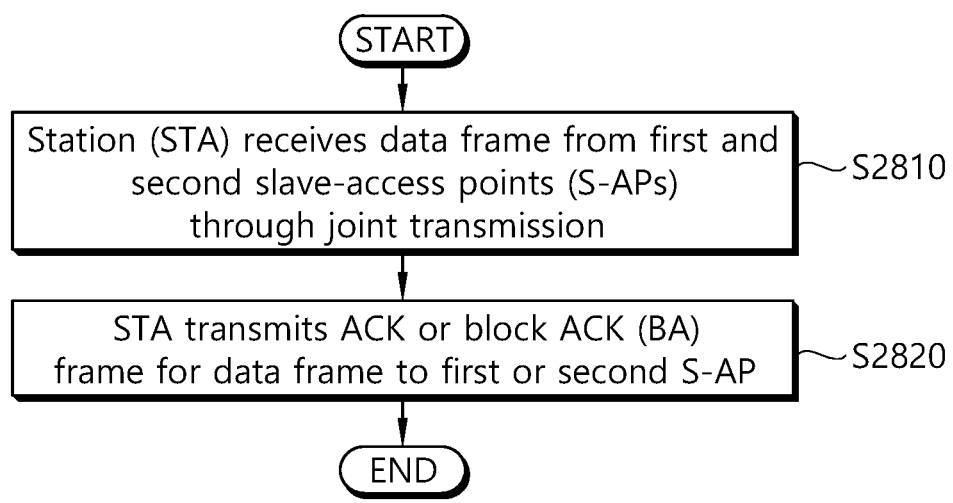
FIG. 28 is a flowchart illustrating a procedure of receiving, by a STA, a joint frame according to the present embodiment.

FIG. 28 is a flowchart illustrating a procedure of receiving, by a STA, a joint frame according to the present embodiment.

An example of FIG. 28 may be performed in a network environment in which a next-generation WLAN system is supported. The next-generation WLAN system is an improved WLAN system of the 802.11ax system, and can satisfy backward compatibility with the 802.11ax system.

The example of FIG. 28 supports a multi-AP, and is performed in a STA supporting an extremely high throughput (EHT) WLAN system. A transmission apparatus of FIG. 28 may correspond to a master-AP (M-AP) or a slave-AP (S-AP) supporting a multi-AP.

In step S2810, a station (STA) receives a data frame from first and second slave-access points (S-APs) through joint transmission.

In step S2820, the STA transmits ACK or a block ACK (BA) frame for the data frame to the first or second S-AP.

The first and second S-APs receive, from the master-access point (M-AP), a first control frame for providing notification of the joint transmission, a second control frame including scheduling information necessary for the joint transmission, and the data frame.

The M-AP acts as a coordinator that coordinates a multi-AP (wherein the first S-AP and second S-APs).

The first control frame may be a joint transmission announcement (JTA) frame. That is, the first control frame may be said to include control information for initiating the joint transmission for the first and second S-APs.

The first control frame may include a first identification and a second identification. The first identification may be an association identifier (AID) or MAC address of the first and second S-APs participating in the joint transmission. The second identification may be a temporary identifier of the first and second S-APs and the STA participating in the joint transmission.

The second control frame may be a synchronization frame or a joint transmission trigger frame.

The second control frame may include information on a bandwidth for the scheduling of the data frame, a resource unit, a modulation and coding scheme (MCS), multi-input multi-output (MIMO), and transmission power.

The synchronization of the first and second S-APs for the joint transmission may be performed based on the synchronization frame.

Furthermore, the M-AP may receive a first ACK frame a response to the first control frame from the first and second S-APs. Furthermore, the M-AP may receive a second ACK frame a response to the data frame from the first and second S-APs. In this case, a procedure of receiving the first and second ACK frames may be selectively omitted.

A third ACK frame, that is, a response to the data frame transmitted through the joint transmission, may be transmitted from the STA to the first S-AP. In this case, the first S-AP is associated with the STA. Accordingly, the STA may transmit the third ACK to only the first S-AP.

The M-AP may receive, from the first S-AP, a fourth ACK frame including the same ACK information as the third ACK frame. Whether the STA has successfully received the data frame through the joint transmission through a procedure of receiving the third and fourth ACK frames may be shared between the APs. In this case, the procedure of receiving the third and fourth ACK frames may be selectively omitted.

All of the aforementioned procedures are performed within one TXOP. If the STA has failed in the reception of the data frame, the STA may perform the joint transmission again by repeating the aforementioned procedures during another TXOP.

The M-AP may select an S-AP that will participate in the joint transmission based on channel state information.

The channel state information may be measured by the STA and included in an NDP frame. The null data packet (NDP) frame may be transmitted from the STA to the first S-AP based on the NDP trigger frame. Likewise, the first S-AP is associated with the STA. The NDP trigger frame may be transmitted from the first S-AP to the STA based on the first control frame. The aforementioned procedures are descriptions of a sounding procedure based on the NDP frame.

The M-AP and the first and second S-APs may be connected through wireless backhaul.

7. Apparatus Configuration

Figure 29:
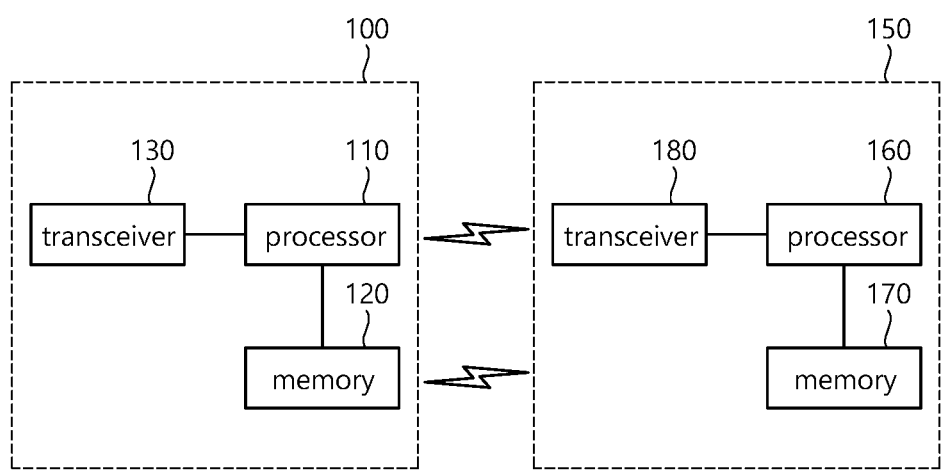
FIG. 29 is a diagram for describing a device for implementing the above-described method.

FIG. 29 is a diagram for describing an apparatus for implementing the aforementioned method.

A wireless apparatus 100 of FIG. 29 is a transmission apparatus capable of implementing the aforementioned embodiment, and may operate as an AP STA. A wireless apparatus 150 of FIG. 29 is a reception apparatus capable of implementing the aforementioned embodiment, and may operate as a non-AP STA.

The transmitting device 100 may include a processor 110, a memory 120, and a transmitting/receiving unit 130, and the receiving device 150 may include a processor 160, a memory 170, and a transmitting/receiving unit 180. The transmitting/receiving unit 130, 180 transmits/receives a radio signal and may be operated in a physical layer of IEEE 802.11/3GPP, and so on. The processor 110, 160 may be operated in the physical layer and/or MAC layer and may be operatively connected to the transmitting/receiving unit 130, 180.

The processor 110, 160 and/or the transmitting/receiving unit 130, 180 may include application-specific integrated circuit (ASIC), other chipset, logic circuit and/or data processor. The memory 120, 170 may include a read-only memory (ROM), a random access memory (RAM), a flash memory, a memory card, a storage medium and/or other storage unit. When the embodiments are executed by software, the techniques or methods described herein can be executed with modules e.g., processes, functions, and so on that perform the functions described herein. The modules can be stored in the memory 120, 170 and executed by the processor 110, 160. The memory 120, 170 can be implemented or positioned within the processor 110, 160 or external to the processor 110, 160. Also, the memory 120, 170 may be connected to the processor 110, 160 by various means known in the art.

The processor 110, 160 may implement the functions, processes and/or methods proposed in the present disclosure. For example, the processor 110, 160 may perform the operation according to the present embodiment.

An operation of the processor 110 of the transmission apparatus is specifically as follows. The processor 110 of the transmission apparatus transmits, to the first and second S-APs, a first control frame for providing notification of the joint transmission, a data frame, or a second control frames including scheduling information necessary for the joint transmission, and performs the joint transmission on a STA through the first and second S-APs.

An operation of the processor 160 of the reception apparatus is specifically as follows. The processor 160 of the reception apparatus receives a data frame from the first and second S-APs through the joint transmission, and transmits ACK or BA for the data frame to the first or the second S-AP.

Figure 30:
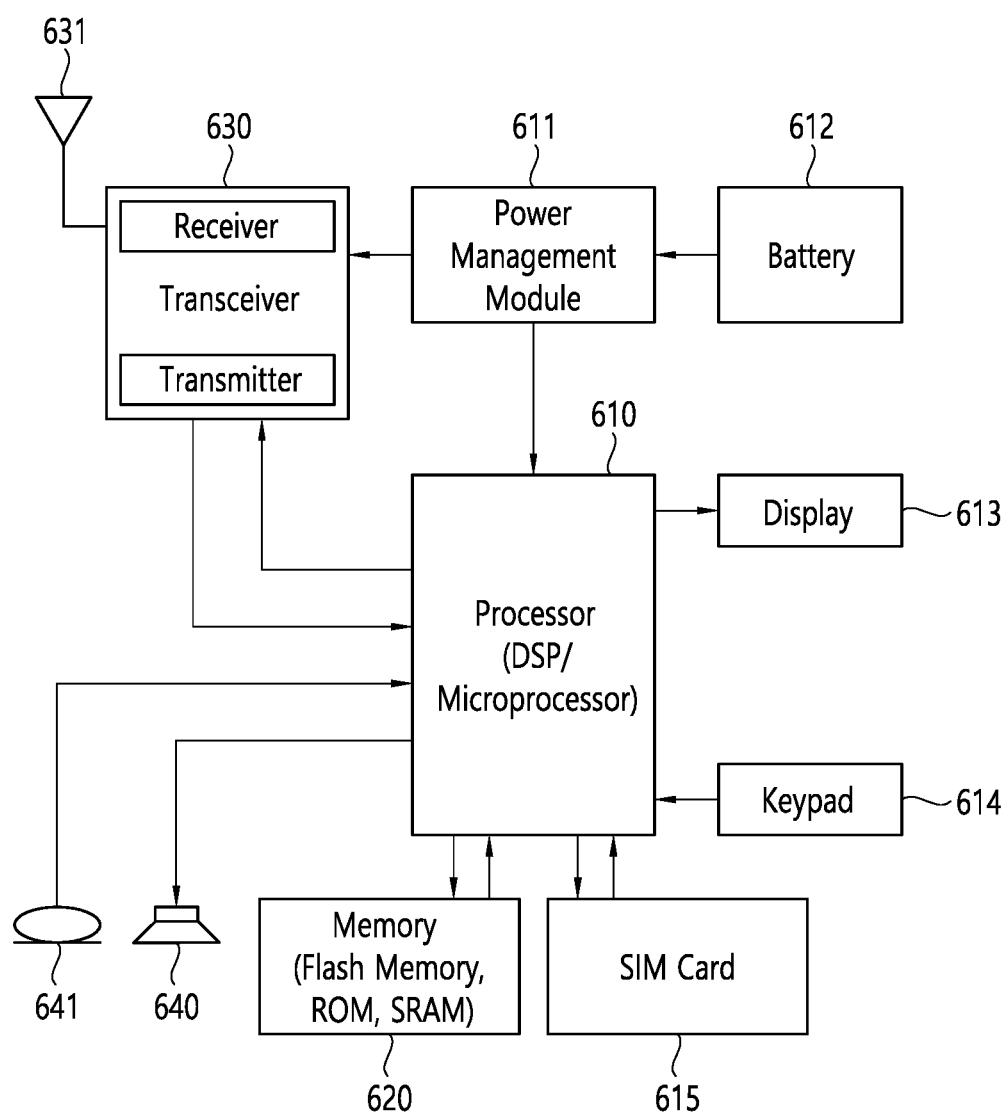
FIG. 30 illustrates a more detailed wireless device for implementing the embodiment of the present disclosure.

FIG. 30 shows a UE to which the technical features of the present disclosure can be applied.

A UE includes a processor 610, a power management module 611, a battery 612, a display 613, a keypad 614, a subscriber identification module (SIM) card 615, a memory 620, a transceiver 630, one or more antennas 631, a speaker 640, and a microphone 641.

The processor 610 may be configured to implement proposed functions, procedures and/or methods of the present disclosure described below. The processor 610 may be configured to control one or more other components of the UE 600 to implement proposed functions, procedures and/or methods of the present disclosure described below. Layers of the radio interface protocol may be implemented in the processor 610. The processor 610 may include application-specific integrated circuit (ASIC), other chipset, logic circuit and/or data processing device. The processor 610 may be an application processor (AP). The processor 610 may include at least one of a digital signal processor (DSP), a central processing unit (CPU), a graphics processing unit (GPU), a modem (modulator and demodulator). An example of the processor 610 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The power management module 611 manages power for the processor 610 and/or the transceiver 630. The battery 612 supplies power to the power management module 611. The display 613 outputs results processed by the processor 610. The keypad 614 receives inputs to be used by the processor 610. The keypad 614 may be shown on the display 613. The SIM card 615 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The memory 620 is operatively coupled with the processor 610 and stores a variety of information to operate the processor 610. The memory 620 may include read-only memory (ROM), random access memory (RAM), flash memory, memory card, storage medium and/or other storage device. When the embodiments are implemented in software, the techniques described herein can be implemented with modules (e.g., procedures, functions, and so on) that perform the functions described herein. The modules can be stored in the memory 620 and executed by the processor 610. The memory 620 can be implemented within the processor 610 or external to the processor 610 in which case those can be communicatively coupled to the processor 610 via various means as is known in the art.

The transceiver 630 is operatively coupled with the processor 610, and transmits and/or receives a radio signal. The transceiver 630 includes a transmitter and a receiver. The transceiver 630 may include baseband circuitry to process radio frequency signals. The transceiver 630 controls the one or more antennas 631 to transmit and/or receive a radio signal.

The speaker 640 outputs sound-related results processed by the processor 610. The microphone 641 receives sound-related inputs to be used by the processor 610.

In the case of the transmission apparatus, the processor 610 transmits, to first and second S-APs, a first control frame for providing notification of the joint transmission, a data frame, and a second control frame including scheduling information necessary for the joint transmission, and performs the joint transmission on a STA through the first and second S-APs.

In the case of the reception apparatus, the processor 610 receives the data frame through the joint transmission from the first and second S-APs, and transmits ACK or BA for the data frame to the first or second S-AP.

The M-AP acts as a coordinator that coordinates a multi-AP (wherein the first S-AP and second S-APs).

The first control frame may be a joint transmission announcement (JTA) frame. That is, the first control frame may be said to include control information for initiating the joint transmission for the first and second S-APs.

The first control frame may include a first identification and a second identification. The first identification may be an association identifier (AID) or MAC address of the first and second S-APs participating in the joint transmission. The second identification may be a temporary identifier of the first and second S-APs and the STA participating in the joint transmission.

The second control frame may be a synchronization frame or a joint transmission trigger frame.

The second control frame may include information on a bandwidth for the scheduling of the data frame, a resource unit, a modulation and coding scheme (MCS), multi-input multi-output (MIMO), and transmission power.

The synchronization of the first and second S-APs for the joint transmission may be performed based on the synchronization frame.

Furthermore, the M-AP may receive a first ACK frame as a response to the first control frame from the first and second S-APs. Furthermore, the M-AP may receive a second ACK frame as a response to the data frame from the first and second S-APs. In this case, a procedure of receiving the first and second ACK frames may be selectively omitted.

A third ACK frame, that is, a response to the data frame transmitted through the joint transmission, may be transmitted from the STA to the first S-AP. In this case, the first S-AP is associated with the STA. Accordingly, the STA may transmit the third ACK to only the first S-AP.

The M-AP may receive, from the first S-AP, a fourth ACK frame including the same ACK information as the third ACK frame. Whether the STA has successfully received the data frame through the joint transmission through the procedure of receiving the third and fourth ACK frames may be shared between the APs. In this case, the procedure of receiving the third and fourth ACK frames may be selectively omitted.

All of the aforementioned procedures are performed within one TXOP. If the STA has failed in the reception of the data frame, the STA may perform the joint transmission again by repeating the aforementioned procedures during another TXOP.

The M-AP may select an S-AP that will participate in the joint transmission based on channel state information.

The channel state information may be measured by the STA and included in an NDP frame. The null data packet (NDP) frame may be transmitted from the STA to the first S-AP based on an NDP trigger frame. Likewise, the first S-AP is associated with the STA. The NDP trigger frame may be transmitted from the first S-AP to the STA based on the first control frame. The aforementioned procedures are descriptions of a sounding procedure based on the NDP frame.

The M-AP and the first and second S-APs may be connected through wireless backhaul.

What is claimed is:

1. A method of performing joint transmission in a WLAN system, comprising:
   transmitting, by a master-access point (M-AP), a null data packet announcement (NDPA) frame for the joint transmission to first to third slave-access points (S-APs);
   based on channel state information, selecting, by the M-AP, the first and second S-APs which is to participate in the joint transmission;
   transmitting, by the M-AP to the first and second S-APs, a first control frame for providing notification of the joint transmission;
   transmitting, by the M-AP to the first and second S-APs, a data frame;
   transmitting, by the M-AP to the first and second S-APs, a second control frame comprising scheduling information necessary for the joint transmission; and
   performing, by the M-AP, the joint transmission on a station (STA) through the first and second S-APs,
   wherein the data frame is transmitted from the first and second S-APs to the STA through the joint transmission,
   wherein the channel state information is measured by the STA and included in a null data packet (NDP) frame,
   wherein the NDP frame is transmitted from the STA to the first to third S-APs based on an NDP trigger frame,
   wherein the NDP trigger frame is transmitted from the third S-AP to the STA based on the NDPA frame, and
   wherein the third S-AP is associated with the STA.

2. The method of claim 1, wherein:
   the first control frame is a joint transmission announcement (JTA) frame,
   the first control frame comprises a first identification and a second identification,
   the first identification is an association identifier (AID) or MAC address of the first and second S-APs participating in the joint transmission, and
   the second identification is a temporary identifier of the first and second S-APs and the STA participating in the joint transmission.

3. The method of claim 1, wherein:
   the second control frame is a synchronization frame or a joint transmission trigger frame,
   the second control frame comprises information on a bandwidth for scheduling of the data frame, a resource unit, a modulation and coding scheme (MCS), multi-input multi-output (MIMO), and transmission power, and
   synchronization of the first and second S-APs for the joint transmission is performed based on the synchronization frame.

4. The method of claim 1, further comprising:
receiving, by the M-AP from the first and second S-APs, a first ACK frame a response to the first control frame; and
receiving, by the M-AP from the first and second S-APs, a second ACK frame as a response to the data frame.

5. The method of claim 4, wherein:
a third ACK frame, which is a response to the data frame transmitted through the joint transmission, is transmitted from the STA to the first S-AP,
the method further comprising: receiving, by the M-AP from the first S-AP, a fourth ACK frame comprising ACK information identical with ACK information of the third ACK frame, and
the first S-AP is associated with the STA.

6. The method of claim 1, wherein the M-AP and the first and second S-APs are connected through wireless backhaul.

7. A master-access point (M-AP) for performing joint transmission in a WLAN system, wherein the M-AP comprises:
a memory;
a transceiver; and
a processor operatively coupled to the memory and the transceiver,
wherein the processor
transmits a null data packet announcement (NDPA) frame for the joint transmission to first to third slave-access points (S-APs);
based on channel state information, selects the first and second S-APs which is to participate in the joint transmission;
transmits to the first and second S-APs a first control frame for providing notification of the joint transmission,
transmits a data frame to the first and second S-APs,
transmits to the first and second S-APs a second control frame comprising scheduling information necessary for the joint transmission, and
performs the joint transmission on a station (STA) through the first and second S-APs,
wherein the data frame is transmitted from the first and second S-APs to the STA through the joint transmission,
wherein the channel state information is measured by the STA and included in a null data packet (NDP) frame,
wherein the NDP frame is transmitted from the STA to the first to third S-APs based on an NDP trigger frame,
wherein the NDP trigger frame is transmitted from the third S-AP to the STA based on the NDPA frame, and
wherein the third S-AP is associated with the STA.

8. The M-AP of claim 7, wherein:
the first control frame is a joint transmission announcement (JTA) frame,
the first control frame comprises a first identification and a second identification,
the first identification is an association identifier (AID) or MAC address of the first and second S-APs participating in the joint transmission, and
the second identification is a temporary identifier of the first and second S-APs and the STA participating in the joint transmission.

9. The M-AP of claim 7, wherein:
the second control frame is a synchronization frame or a joint transmission trigger frame,
the second control frame comprises information on a bandwidth for scheduling of the data frame, a resource unit, a modulation and coding scheme (MCS), multi-input multi-output (MIMO), and transmission power, and
synchronization of the first and second S-APs for the joint transmission is performed based on the synchronization frame.

10. The M-AP of claim 7, wherein:
the processor receives from the first and second S-APs a first ACK frame a response to the first control frame, and
the processor receives from the first and second S-APs a second ACK frame as a response to the data frame.

11. The M-AP of claim 10, wherein:
a third ACK frame, which is a response to the data frame transmitted through the joint transmission, is transmitted from the STA to the first S-AP,
the processor receives from the first S-AP a fourth ACK frame comprising ACK information identical with ACK information of the third ACK frame, and
the first S-AP is associated with the STA.

12. The M-AP of claim 7, wherein the M-AP and the first and second S-APs are connected through wireless backhaul.

* * * * *